US010665150B2

(12) United States Patent
Kobayashi

(10) Patent No.: US 10,665,150 B2
(45) Date of Patent: May 26, 2020

(54) DISPLAY DEVICE, DISPLAY MODULE, AND ELECTRONIC DEVICE

(71) Applicant: Semiconductor Energy Laboratory Co., Ltd., Atsugi-shi, Kanagawa-ken (JP)

(72) Inventor: Hidetomo Kobayashi, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 164 days.

(21) Appl. No.: 15/641,502

(22) Filed: Jul. 5, 2017

(65) Prior Publication Data

US 2018/0012535 A1 Jan. 11, 2018

(30) Foreign Application Priority Data

Jul. 8, 2016 (JP) .................. 2016-135720

(51) Int. Cl.
*G09G 3/20* (2006.01)
*G09G 3/36* (2006.01)
(Continued)

(52) U.S. Cl.
CPC ......... *G09G 3/2092* (2013.01); *G09G 3/2007* (2013.01); *G09G 3/3225* (2013.01);
(Continued)

(58) Field of Classification Search
CPC ..................... G09G 3/2092; G09G 2300/0456
See application file for complete search history.

(56) References Cited

U.S. PATENT DOCUMENTS 6,317,109 B1 11/2001 Lee
6,714,268 B2 3/2004 Wang et al.
(Continued)

FOREIGN PATENT DOCUMENTS

JP 2001-066593 A 3/2001
JP 2002-196702 A 7/2002
(Continued)

OTHER PUBLICATIONS

Sakuishi.T et al., "Transmissive OLED and Reflective LC Hybrid (TR-Hybrid) Display with High Visibility and Low Power Consumotion", SID Digest '16: SID International Symposium Digest of Technical Papers, May 22, 2016, vol. 47, pp. 735-738.
(Continued)

*Primary Examiner* — Nitin Patel
*Assistant Examiner* — Robert M Stone
(74) *Attorney, Agent, or Firm* — Fish & Richardson P.C.

(57) ABSTRACT

The display device includes a pixel and a driver circuit. The driver circuit includes a receiving circuit, a controller, a switching control circuit, and a signal generation circuit. The receiving circuit outputs image data obtained by converting differential signals into parallel data to the controller. The receiving circuit includes a plurality of circuits each including a first amplifier and a second amplifier. The first amplifier and the second amplifier each include a switch and a first transistor for supplying a bias current. The switch has a function of controlling electrical continuity between a wiring for supplying a bias voltage and a gate of the first transistor. The switching control circuit has a function of outputting a switching signal for controlling electrical continuity of the switch.

20 Claims, 17 Drawing Sheets

(51) Int. Cl.
*G09G 3/3225* (2016.01)
*G06F 3/041* (2006.01)

(52) U.S. Cl.
CPC ......... *G09G 3/3607* (2013.01); *G09G 3/3648* (2013.01); *G09G 3/3688* (2013.01); *G06F 3/041* (2013.01); *G06F 2203/0339* (2013.01); *G06F 2203/04102* (2013.01); *G09G 2300/046* (2013.01); *G09G 2300/0456* (2013.01); *G09G 2310/0291* (2013.01); *G09G 2310/08* (2013.01); *G09G 2330/021* (2013.01); *G09G 2360/144* (2013.01)

(56) References Cited

U.S. PATENT DOCUMENTS

| | | | |
|---|---|---|---|
| 7,038,641 B2 | 5/2006 | Hirota et al. | |
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,385,654 B2 | 6/2008 | Mitsui et al. | |
| 9,135,880 B2 | 9/2015 | Koyama | |
| 10,170,030 B2* | 1/2019 | Perdices-Gonzalez | G09G 3/348 |
| 2003/0052869 A1* | 3/2003 | Fujii | G02F 1/133555 345/204 |
| 2003/0201960 A1* | 10/2003 | Fujieda | G02F 1/133603 345/87 |
| 2004/0212578 A1* | 10/2004 | Itou | G09G 5/006 345/100 |
| 2004/0246434 A1* | 12/2004 | Ohashi | G09G 3/3406 349/199 |
| 2006/0072047 A1* | 4/2006 | Sekiguchi | G02F 1/1335 349/25 |
| 2007/0001956 A1* | 1/2007 | Yeh | G09G 3/3233 345/92 |
| 2007/0008005 A1* | 1/2007 | Komatsu | H01L 23/50 326/82 |
| 2007/0045620 A1* | 3/2007 | Park | G09G 3/3233 257/40 |
| 2007/0055812 A1* | 3/2007 | Komatsu | G06F 13/409 711/100 |
| 2008/0180618 A1 | 7/2008 | Fujieda | |
| 2008/0238442 A1* | 10/2008 | Ryu | G09G 3/006 324/629 |
| 2008/0238819 A1* | 10/2008 | Ryu | G09G 3/006 345/55 |
| 2009/0009505 A1 | 1/2009 | Koyama | |
| 2009/0303224 A1* | 12/2009 | Yoshida | G09G 3/3648 345/213 |
| 2010/0103090 A1* | 4/2010 | Baek | G09G 3/3426 345/102 |
| 2010/0171905 A1 | 7/2010 | Huang et al. | |
| 2010/0315394 A1* | 12/2010 | Katoh | G06F 1/3218 345/207 |
| 2011/0096106 A1* | 4/2011 | Nomaguchi | G09G 3/2092 345/691 |
| 2012/0127140 A1* | 5/2012 | Ryan | G09G 3/3648 345/207 |
| 2012/0133688 A1* | 5/2012 | Shimomaki | H03F 3/45219 345/690 |
| 2013/0057531 A1* | 3/2013 | Lim | G09G 3/20 345/211 |
| 2013/0141372 A1* | 6/2013 | Kang | G06F 3/041 345/173 |
| 2013/0293451 A1* | 11/2013 | Yeh | G09G 3/36 345/99 |
| 2016/0070386 A1* | 3/2016 | Yamamoto | G06F 3/044 345/174 |
| 2016/0210910 A1 | 7/2016 | Yamazaki et al. | |
| 2017/0032755 A1* | 2/2017 | Ko | G09G 3/3648 |
| 2017/0032757 A1* | 2/2017 | Itoigawa | H03L 7/00 |
| 2017/0092177 A1* | 3/2017 | Kobayashi | G09G 3/2018 |
| 2017/0103697 A1* | 4/2017 | Kawashima | G06F 1/3265 |
| 2017/0103714 A1* | 4/2017 | Yamamoto | G02F 1/13306 |
| 2017/0179160 A1 | 6/2017 | Takahashi | |
| 2017/0357113 A1 | 12/2017 | Yamazaki et al. | |
| 2017/0365203 A1 | 12/2017 | Takahashi | |
| 2018/0061307 A1* | 3/2018 | Inoue | G09G 3/3275 |

FOREIGN PATENT DOCUMENTS

| | | |
|---|---|---|
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 2008-225381 A | 9/2008 |
| JP | 4161574 B2 | 10/2008 |
| JP | 2011-154356 A | 8/2011 |
| JP | 2012-063753 A | 3/2012 |
| JP | 2013-221965 A | 10/2013 |
| JP | 2017-116932 A | 6/2017 |
| WO | WO-2004-053819 A | 6/2004 |

OTHER PUBLICATIONS

Ohide.T et al., "Application of Transfer Technology to Manufacturing of Transmissive OLED and Reflective LC Hybrid (TR-Hybrid) Display", SID Digest '16 : SID International Symposium Digest of Technical Papers, May 22, 2016, vol. 47, pp. 1002-1004.

Shieh.H, "Transflective display by Hybrid OLED and LCD", LEOS 2005 (IEEE Lasers and Electro-Optics Society Annual Meeting), Oct. 22, 2005, pp. 650-651, IEEE.

Lee.J et al., "High ambient-contrast-ratio display using tandem reflective liquid crystal display and organic light-emitting device", Optics Express, Nov. 14, 2005, vol. 13, No. 23, pp. 9431-9438.

Kusunoki.K et al., "Transmissive OLED and Reflective LC Hybrid (TR-Hybrid) Display", SID Digest '16 : SID International Symposium Digest of Technical Papers, May 22, 2016, vol. 47, pp. 57-60.

* cited by examiner

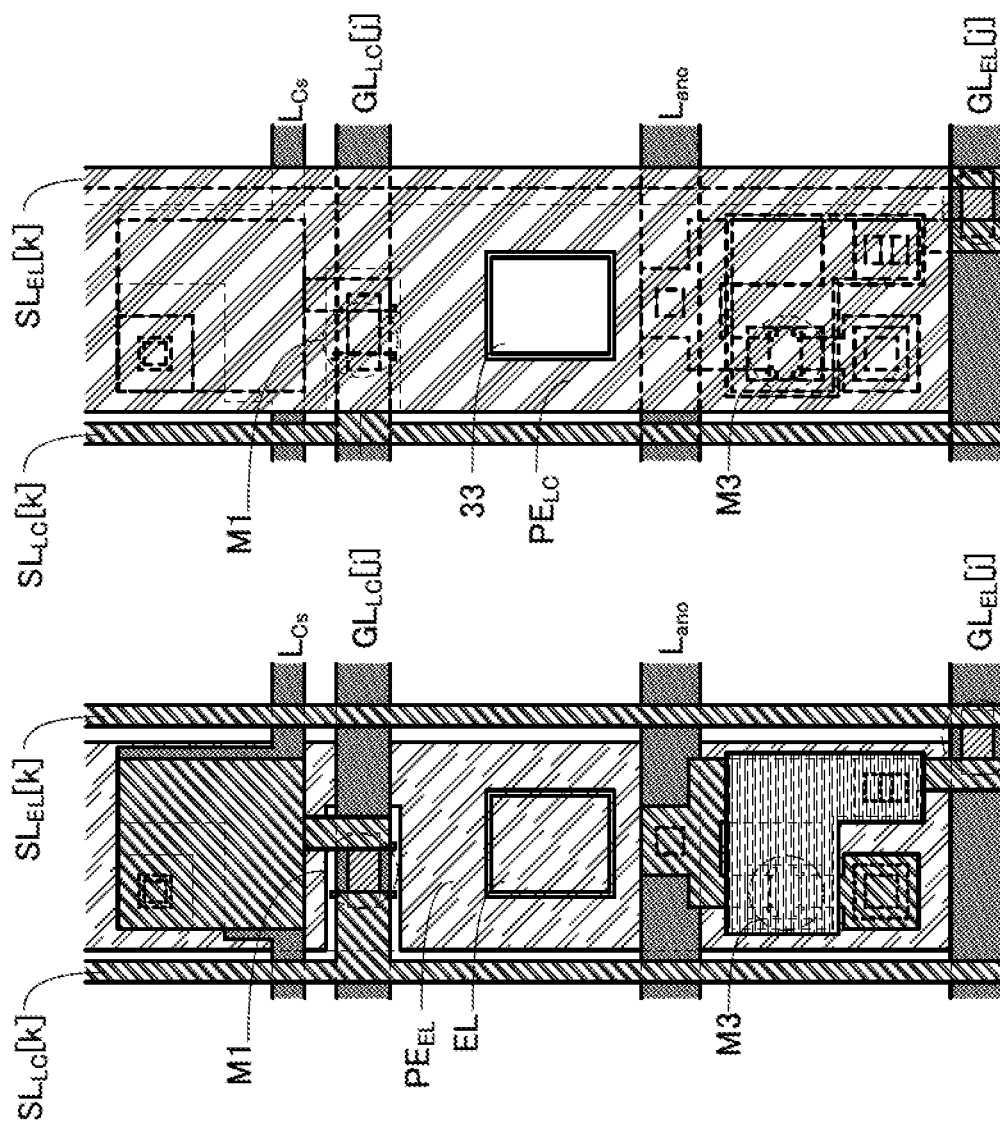
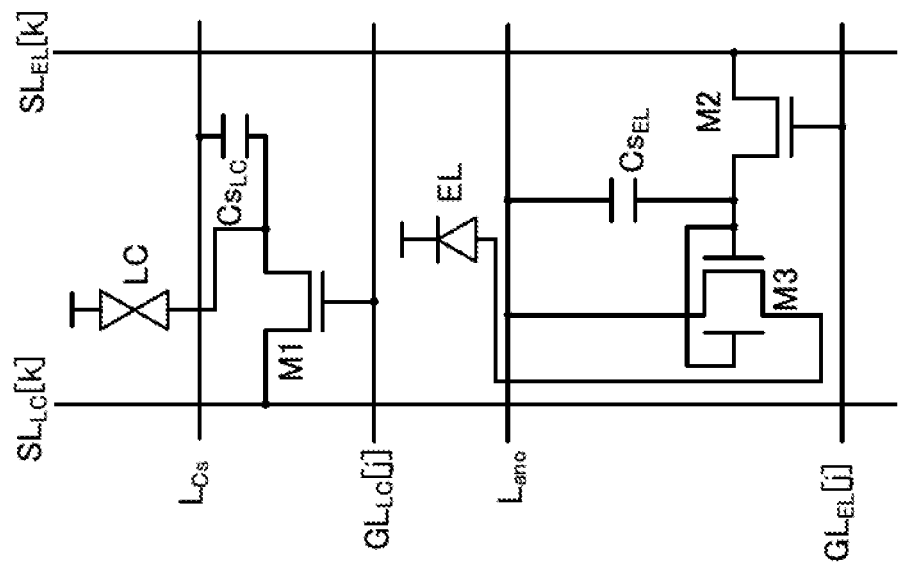
FIG. 12A
FIG. 12B
FIG. 12C

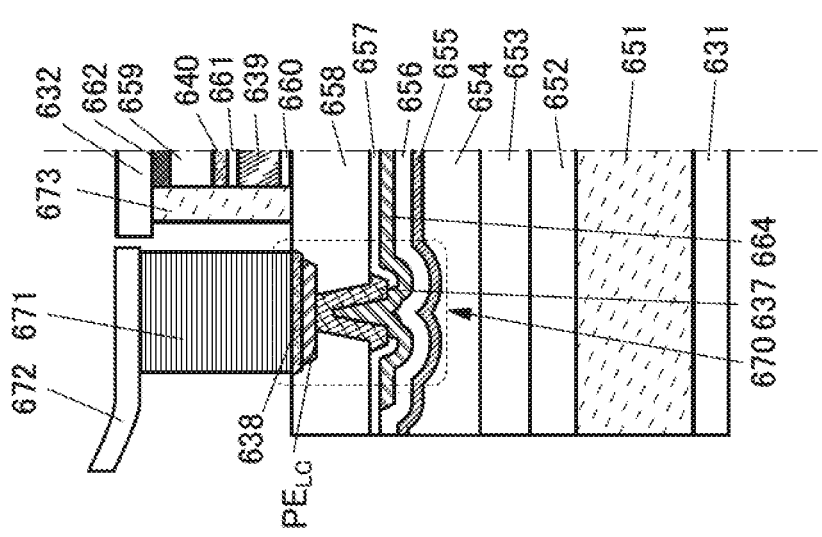
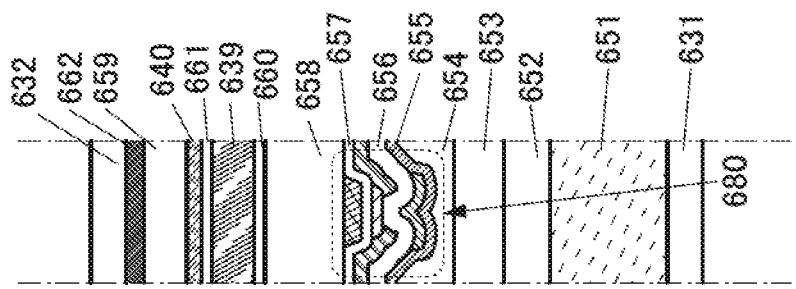
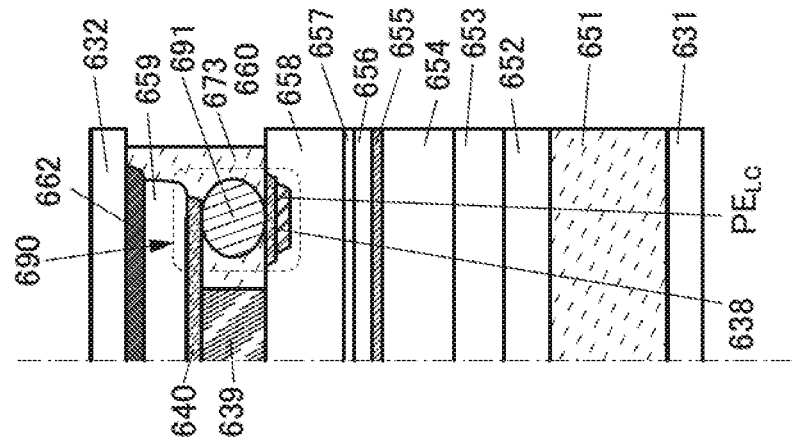

FIG. 17A
9100
FIG. 17D
9200
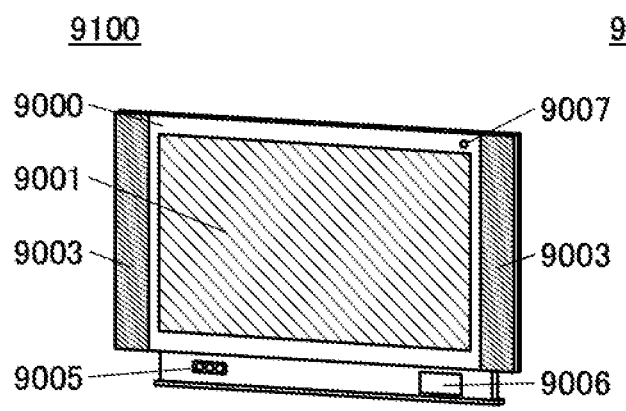
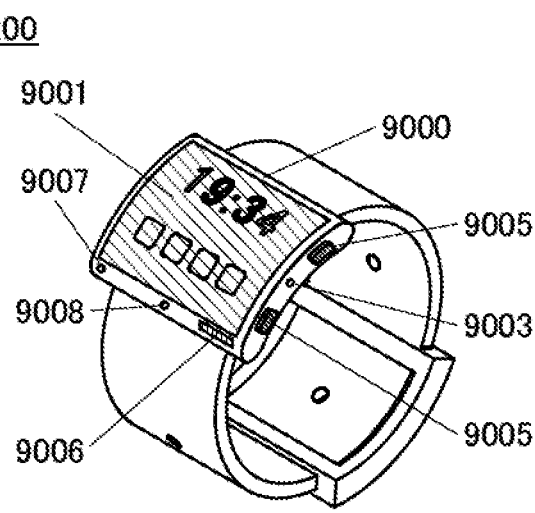
FIG. 17B
9101
FIG. 17E
9201
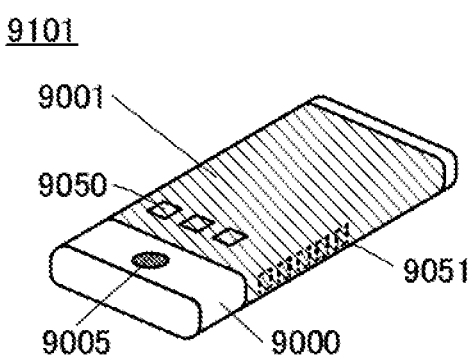
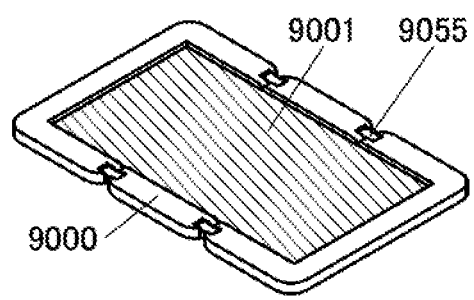
FIG. 17C
9102
FIG. 17F
9201
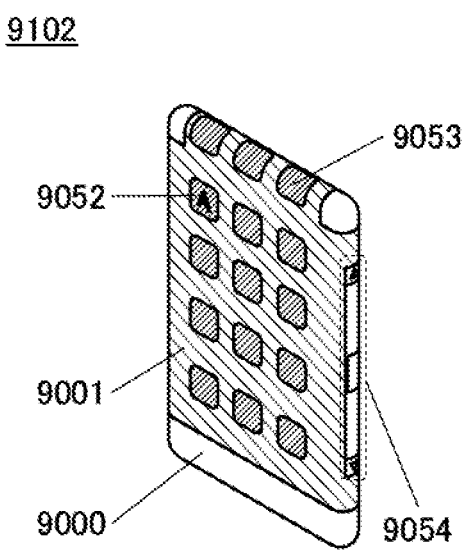
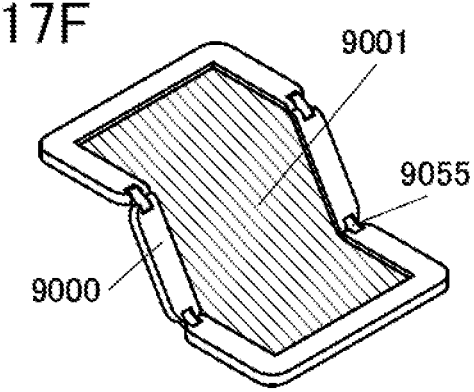
FIG. 17G
9201
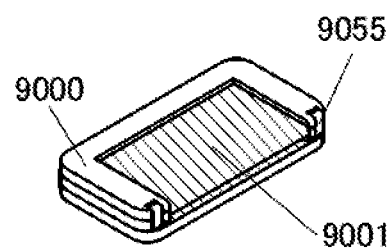

DISPLAY DEVICE, DISPLAY MODULE, AND ELECTRONIC DEVICE

BACKGROUND OF THE INVENTION

1. Field of the Invention

One embodiment of the present invention relates to a display device, a display module, and an electronic device.

2. Description of the Related Art

A display device including a reflective liquid crystal element combined with a light-emitting element using electroluminescence (EL) has been proposed (see Patent Document 1).

In the structure disclosed in Patent Document 1, a display element determination portion determines that one of a reflective liquid crystal element driver integrated circuit (IC) and a light-emitting element driver IC operates whereas the other stops operating.

REFERENCE

Patent Document

[Patent Document 1] Japanese Published Patent Application No. 2008-225381

SUMMARY OF THE INVENTION

An object of one embodiment of the present invention is to provide a display device in which a reflective liquid crystal element and a light-emitting element are switched for display, and power consumption can be reduced in accordance with a change in usage environment. Another object of one embodiment of the present invention is to provide a display device with visibility increased in accordance with a change in usage environment. Another object of one embodiment of the present invention is to provide a display device with improved convenience.

The description of these objects does not preclude the existence of other objects. One embodiment of the present invention does not necessarily achieve all the objects. Other objects are apparent from and can be derived from the description of the specification, the drawings, the claims, and the like.

One embodiment of the present invention is a display device including a pixel and a driver circuit. The pixel includes a liquid crystal element, a first pixel circuit for driving the liquid crystal element, a light-emitting element, and a second pixel circuit for driving the light-emitting element. The liquid crystal element includes a reflective electrode having an opening and has a function of performing grayscale display by reflecting external light. The light-emitting element has a function of performing grayscale display by emitting light through the opening. The driver circuit includes a receiving circuit, a controller, a switching control circuit, and a signal generation circuit. The receiving circuit has a function of converting differential signals of serial data into image data of parallel data and outputting the image data to the controller. The signal generation circuit has a function of outputting a gray scale voltage for driving the liquid crystal element and a grayscale voltage for driving the light-emitting element in accordance with the control with the controller. The receiving circuit includes a plurality of amplifier circuits for receiving the differential signals. The amplifier circuit includes a switch and a first transistor for supplying a bias current. The switch has a function of controlling electrical continuity between a wiring for supplying a bias voltage and a gate of the first transistor. The switching control circuit has a function of outputting a switching signal for controlling electrical continuity of the switch in accordance with the control with the controller.

In the display device of one embodiment of the present invention, the amplifier circuit preferably includes a first amplifier and a second amplifier.

The display device of one embodiment of the present invention preferably includes a sensor. In the display device, it is preferable that the sensor have a function of measuring illuminance and a host processor have a function of switching between, in accordance with the illuminance, a first mode for performing grayscale display with the liquid crystal element, a second mode for performing grayscale display with the liquid crystal element and the light-emitting element, and a third mode for performing grayscale display with the light-emitting element.

In the display device of one embodiment of the present invention, each of the first pixel circuit and the second pixel circuit preferably includes a second transistor that includes a metal oxide in a semiconductor layer where a channel formation region is formed.

In the display device of one embodiment of the present invention, the differential signals preferably include a first differential signal for driving the liquid crystal element and a second differential signal for driving the light-emitting element, and the amplifier circuit preferably includes a first amplifier circuit to which the first differential signal is input and a second amplifier circuit to which the second differential signal is input.

In the display device of one embodiment of the present invention, the switching signal preferably includes a first switching signal to be supplied to the first amplifier circuit and a second switching signal to be supplied to the second amplifier circuit.

Note that other embodiments of the present invention will be shown in the following embodiments and the drawings.

According to one embodiment of the present invention, it is possible to provide a display device in which a reflective liquid crystal element and a light-emitting element are switched for display, and power consumption can be reduced in accordance with a change in usage environment. According to another embodiment of the present invention, it is possible to provide a display device with visibility increased in accordance with a change in usage environment. According to another embodiment of the present invention, it is possible to provide a display device with improved convenience.

BRIEF DESCRIPTION OF THE DRAWINGS

In the accompanying drawings:

FIGS. 12A to 12C are a circuit diagram and layout diagrams illustrating a structure example of a display device;

FIGS. 15A to 15C are schematic cross-sectional views illustrating a structure example of a display device;

FIGS. 17A to 17G illustrate electronic devices.

DETAILED DESCRIPTION OF THE INVENTION

Hereinafter, embodiments will be described with reference to the drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

<Structure Example of Display Device>

A structure example of a display device will be described with reference to FIG. 1.

Figure 1:
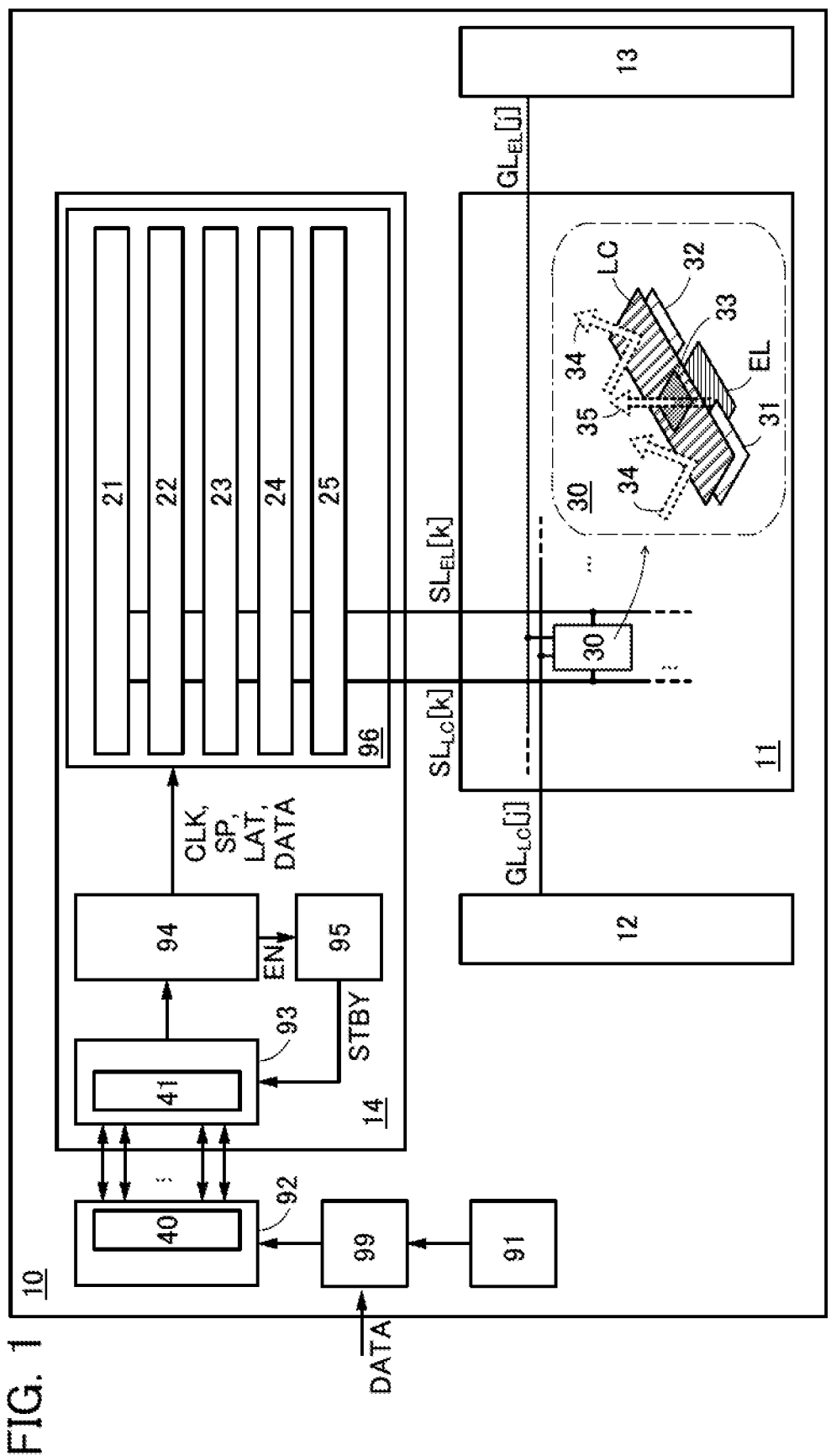
FIG. 1 is a block diagram illustrating a structure example of a display device.

FIG. 1 is a block diagram illustrating a pixel portion in a display device and peripheral circuits of the pixel portion. A display device 10 illustrated in FIG. 1 includes a pixel portion 11, a driver circuit 12, a driver circuit 13, a driver circuit 14, a sensor 91, a host processor 99, and a transmitting circuit 92.

The pixel portion 11 includes a plurality of pixels, for example, pixels arranged in m rows and n columns (each of m and n is a natural number). In FIG. 1, a pixel 30 in a j-th row and a k-th column (j is a natural number less than or equal to m, and k is a natural number less than or equal to n) is shown as a pixel in an arbitrary row and an arbitrary column.

The structure of the pixel 30 will be described.

FIG. 1 shows a schematic diagram of the pixel 30. The pixel 30 includes a pixel circuit 31, a pixel circuit 32, a liquid crystal element LC, and a light-emitting element EL. The pixel circuit 31 controls the grayscale display of the liquid crystal element LC, whereas the pixel circuit 32 controls the grayscale display of the light-emitting element EL. Note that the liquid crystal element LC includes a reflective electrode. In the liquid crystal element LC, the intensity of light reflected on the reflective electrode is adjusted by a liquid crystal layer to perform grayscale display. In the light-emitting element EL, light emission is adjusted by changing the amount of current flowing between electrodes to perform grayscale display. Note that details of the cross-sectional structure and the like of the pixel will be described later.

The schematic diagram of the pixel 30 in FIG. 1 illustrates the arrangement of the pixel circuit 31, the pixel circuit 32, the liquid crystal element LC, and the light-emitting element EL. The liquid crystal element LC illustrated in FIG. 1 includes an opening 33. The opening 33 is provided in the reflective electrode. The light-emitting element EL illustrated in FIG. 1 is provided to overlap with the opening 33 of the liquid crystal element LC.

The pixel circuit 31 and the pixel circuit 32 illustrated in FIG. 1 are provided between a layer including the liquid crystal element LC and a layer including the light-emitting element EL. An element layer including transistors in the pixel circuit 31 for driving the liquid crystal element LC and an element layer including transistors in the pixel circuit 32 for driving the light-emitting element EL are formed in the same process, so that the pixel circuit 31 and the pixel circuit 32 are arranged in the same layer. This structure offers a driver circuit in which a driver circuit for applying a grayscale voltage to the liquid crystal element LC is integrated with a driver circuit for applying a grayscale voltage to the light-emitting element EL. Although the pixel circuit 31 and the pixel circuit 32 are provided between the layer including the liquid crystal element LC and the layer including the light-emitting element EL in FIG. 1, the pixel circuits may be provided over or under the liquid crystal element LC and the light-emitting element EL.

In the pixel 30 with the structure illustrated in FIG. 1, grayscale display can be performed by the control of the intensity of reflected light 34 of the liquid crystal element LC and the control of the intensity of light 35 emitted from the light-emitting element EL through the opening 33. Note that the reflected light 34 and the light 35 emitted from the light-emitting element EL are emitted toward a display surface of the display device 10.

In the pixel 30 with the structure illustrated in FIG. 1, the circuits for driving the pixels, such as the pixel circuit 31 and the pixel circuit 32, can be arranged under the reflective electrode of the liquid crystal element LC. This prevents a decrease in aperture ratio due to the addition of the pixel circuit 32 for driving the light-emitting element EL.

Also in the pixel 30 with the structure illustrated in FIG. 1, the intensity of external light reflected on the reflective electrode of the liquid crystal element LC is adjusted by the liquid crystal layer to perform grayscale display. This results in improved visibility in outdoor environments of the display device 10 including the pixel 30 in FIG. 1.

Also in the pixel 30 with the structure illustrated in FIG. 1, the intensity of the light 35 emitted from the light-emitting element EL is adjusted to perform grayscale display. This results in improved visibility of the display device 10 including the pixel 30 in FIG. 1 in indoor environments with low illuminance.

Note that the sensor 91 capable of measuring illuminance is provided in the display device 10, whereby display in outdoor environments performed by the control of the liquid crystal element LC and display in indoor environments performed by the control of the light-emitting element EL can be switched. The illuminance obtained by the sensor 91 is input to the host processor 99. In accordance with the illuminance, the host processor 99 switches the image data which is output depending on the display element to be controlled. The image data output from the transmitting circuit 92 to the driver circuit 14 is output as differential signals of serial data. In the receiving circuit 93 to which the differential signals of the serial data are input, the differential signals are converted into parallel data. Image data obtained by the conversion into parallel data is a signal for controlling at least one of the liquid crystal element LC and the light-emitting element EL to perform grayscale display.

Differential signals output from the transmitting circuit 92 to the driver circuit 14 can be separated into lanes which output the differential signals for controlling the liquid crystal element LC and lanes which output the differential signals for controlling the light-emitting element EL among a plurality of lanes. In the case where grayscale display is performed by controlling at least one of the liquid crystal element LC and the light-emitting element EL, the differential signals can be received by at least one of the lanes which output the differential signals for controlling the liquid crystal element LC and the lanes which output the differential signals for controlling the light-emitting element EL among a plurality of lanes through which the differential signals are output from the transmitting circuit 92 to the driver circuit 14.

Note that in the display device 10, at least one of the liquid crystal element LC and the light-emitting element EL can be controlled to perform grayscale display. Alternatively, both of the liquid crystal element LC and the light-emitting element EL can be controlled to perform grayscale display in the display device 10, which is preferable because the visibility of the display device 10 can be improved as compared with the case where grayscale display is performed with one of the liquid crystal element LC and the light-emitting element EL.

Furthermore, in the structure illustrated in FIG. 1, each pixel includes the pixel circuit 31 for controlling the liquid crystal element LC and the pixel circuit 32 for controlling the light-emitting element EL. In other words, grayscale display with the liquid crystal element LC and grayscale display with the light-emitting element EL can be independently controlled in each pixel 30. In such a structure, the control with a backlight for concurrently emitting light in a plurality of pixels is not performed, but light emission of the light-emitting element EL can be controlled in each pixel (minimum unit) in accordance with an image to be displayed, whereby unnecessary light emission can be prevented. Hence, lower power consumption can be achieved in the display device 10 including the pixel 30 in FIG. 1.

The pixel 30 can be used not only as a pixel in a display device for monochrome display but also as a pixel in a display device for color display when a color filter is provided. In color display, the pixel 30 corresponds to a subpixel with any of three color elements of RGB (R, G, and B represent red, green, and blue, respectively). The number of subpixels in one pixel is not limited to three. For example, one pixel may include four subpixels: an R subpixel, a G subpixel, a B subpixel, and a W (white) subpixel. Alternatively, a color element may be composed of two colors among R, G, and B as in PenTile layout. The two colors may differ among color elements.

The above is the description of the structure of the pixel 30.

Next, the peripheral driver circuits of the pixel portion 11, such as the driver circuits 12, 13, and 14, the sensor 91, the host processor 99, and the transmitting circuit 92 will be described.

The driver circuit 12 has a function of transmitting a scanning signal to a gate line $GL_{LC}[j]$. The scanning signal output from the driver circuit 12 is transmitted to the pixel 30 through the gate line $GL_{LC}[j]$. With the scanning signal supplied to the gate line $GL_{LC}[j]$, a grayscale voltage that has been supplied to a signal line $SL_{LC}[k]$ is written to the pixel 30. Note that the driver circuit 12 is composed of shift registers and the like to which various signals (e.g., a clock signal and a start pulse) are input to drive.

The driver circuit 13 has a function of transmitting a scanning signal to a gate line $GL_{EL}[j]$. The scanning signal output from the driver circuit 13 is transmitted to the pixel 30 through the gate line $GL_{EL}[j]$. With the scanning signal supplied to the gate line $GL_{EL}[j]$, a grayscale voltage that has been supplied to a signal line $SL_{EL}[k]$ is written to the pixel 30. Note that the driver circuit 13 is composed of shift registers and the like to which various signals (e.g., a clock signal and a start pulse) are input to drive.

The sensor 91 has a function of measuring the illuminance in the vicinity of the display device 10.

The host processor 99 has a function of switching image data DATA or the like, which is supplied from the outside in accordance with the illuminance obtained by the sensor 91, in accordance with the corresponding display element and outputting the data to the driver circuit 14. For example, when display is performed in outdoor environments where the illuminance is high, the image data DATA is switched so that display is performed by controlling the liquid crystal element LC and output. When display is performed in indoor environments where the illuminance is low, the image data DATA is switched so that display is performed by controlling the light-emitting element EL and output.

Signals are transmitted and received between the transmitting circuit 92 and the receiving circuit 93 by low voltage differential signaling (LVDS). The transmitting circuit 92 includes an amplifier circuit 40, which converts the image data switched by the host processor 99 into differential signals of serial data and outputs the signals. The amplifier circuit 40 is composed of amplifiers. The amplifier circuit 40 is also called an LVDS transmitter. LVDS is a communication technology that enables relatively high-speed operation, lower power consumption due to a small amplitude signal, and a reduction in the number of wirings and the influence of noises. LVDS can remove noises using differential amplification with an amplifier, and thus can suppress a reduction in display quality.

The driver circuit 14 includes the receiving circuit 93, a controller 94, a switching control circuit 95, and a signal generation circuit 96.

The receiving circuit 93 includes an amplifier circuit 41 to which differential signals of serial data from the transmitting circuit 92 are input. The amplifier circuit 41 is composed of amplifiers. The amplifier circuit 41 is also called an LVDS receiver.

Differential signals output from the amplifier circuit 40 to the amplifier circuit 41 can be separated into lanes which output the differential signals for controlling the liquid crystal element LC and lanes which output the differential signals for controlling the light-emitting element EL among a plurality of lanes. In the case where image data is switched in the host processor 99 in accordance with the illuminance obtained by the sensor 91, a plurality of lanes which output differential signals from the amplifier circuit 40 to the amplifier circuit 41 can be separated into lanes which output the differential signals for controlling the liquid crystal element LC and lanes which output the differential signals for controlling the light-emitting element EL. The differential signals of serial data received by the receiving circuit 93 are converted into image data of parallel data and output to the controller 94.

The controller 94 has a function of outputting, in accordance with the image data output from the receiving circuit 93, clock signals CLK, start pulses SP, latch signals LAT, image data DATA, and the like, which control the operation of the driver circuits 12, 13, and 14, to the signal generation circuit 96. The controller 94 has a function of outputting a control signal EN for controlling a switching signal STBY to the switching control circuit 95 in response to the display element which performs display on the basis of the image data.

The controller 94 receives a signal from the host processor 99 to output the control signal EN for controlling the switching signal STBY. The signal is received by the controller 94 through an interface which is different from the above-described LVDS.

The switching control circuit 95 has a function of controlling the switching signal STBY in accordance with the control signal EN which is output from the controller 94. The switching signal STBY is a signal for switching the stop and restart of a bias current flowing to an amplifier of a lane which does not contribute to display among a plurality of lanes included in the amplifier circuit 41.

An amplifier in the amplifier circuit 41 includes a transistor for supplying a bias current. A switch is provided between a wiring for supplying a bias voltage and a gate of a transistor for supplying a bias current and controls electrical continuity. With such a structure, an amplifier of the receiving circuit 93 which receives a signal for driving the liquid crystal element LC and an amplifier of the receiving circuit 93 which receives a signal for driving the light-emitting element EL in the LVDS receiver can be alternately stopped even when the driver circuit for the liquid crystal element LC and the driver circuit for the light-emitting element EL are integrally formed.

The signal generation circuit 96 has a function of transmitting a grayscale voltage for driving the liquid crystal element LC included in the pixel 30 to the signal line $SL_{LC}[k]$. Furthermore, the signal generation circuit 96 has a function of transmitting a grayscale voltage for driving the light-emitting element EL included in the pixel 30 to the signal line $SL_{EL}[k]$. The grayscale voltage supplied to the signal line $SL_{LC}[k]$ is a voltage for driving the liquid crystal element LC included in the pixel 30. The grayscale voltage supplied to the signal line $SL_{EL}[k]$ is a voltage for driving the light-emitting element EL included in the pixel 30. Note that various signals (e.g., a clock signal, a start pulse, a latch signal, and image data) for driving are input to the signal generation circuit 96 from the controller 94.

The signal generation circuit 96 illustrated in FIG. 1 includes, for example, a shift register 21, a latch 22, a level shifter 23, a digital/analog (D/A) converter 24, and a buffer amplifier 25, from which a grayscale voltage is output to the signal line $SL_{LC}[k]$ and the signal line $SL_{EL}[k]$ in each column.

A clock signal CLK and a start pulse SP are input to the shift register 21, and a pulse signal is generated therein. In the latch 22, image data DATA as a digital signal is stored in accordance with the pulse signal input thereto, and the stored image data is output in accordance with a latch signal LAT. The image data is input to the level shifter 23 in accordance with the latch signal LAT, and the voltage of the digital signal is amplified. In the D/A converter 24, the image data as digital data is converted into a grayscale voltage of analog data.

The buffer amplifier 25 includes a buffer amplifier for outputting a grayscale voltage to the signal line $SL_{LC}[k]$ and a buffer amplifier for outputting a grayscale voltage to the signal line $SL_{EL}[k]$. Each buffer amplifier outputs a desired voltage by controlling a bias current flowing through an operational amplifier functioning as a voltage follower. In addition, a plurality of switching signals STBY may be input to the buffer amplifier 25 to switch the stop and restart of the bias current flowing through the operational amplifier functioning as a voltage follower.

In the display device with the structure of FIG. 1, an amplifier of the receiving circuit which receives a signal for driving the liquid crystal element LC and an amplifier of the receiving circuit which receives a signal for driving the light-emitting element EL can be alternately stopped even when the driver circuit for the liquid crystal element and the driver circuit for the light-emitting element are integrally formed.

The above-described display device 10 including the pixel 30 can have excellent visibility both outdoors and indoors. In addition, in the above-described display device 10 including the switching control circuit 95 and the receiving circuit 93, an amplifier of the receiving circuit 93 which receives a signal for driving the liquid crystal element LC and an amplifier of the receiving circuit 93 which receives a signal for driving the light-emitting element EL can be alternately stopped. Thus, the display device with lower power consumption can be obtained.

<Configuration Example of Receiving Circuit>

A configuration example of the amplifier circuit 41 which can control the stop and restart of a bias current in the above-described receiving circuit 93 will be described with reference to FIG. 2, FIGS. 3A and 3B, FIGS. 4A and 4B, FIG. 5, FIG. 6, and FIG. 7.

Figure 2:
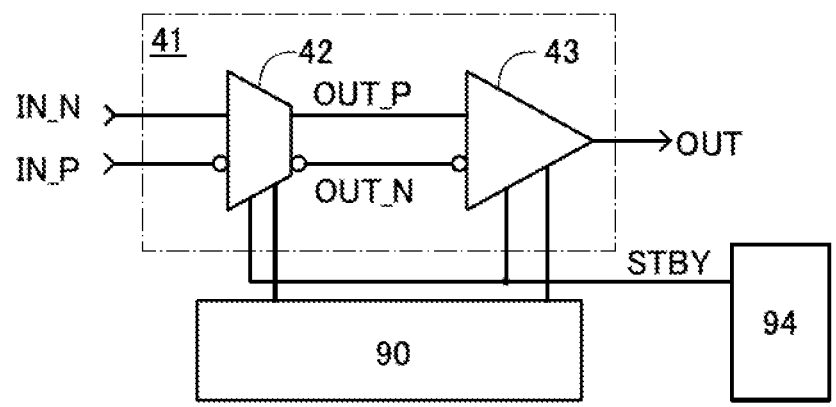
FIG. 2 is a circuit diagram illustrating a structure example of a display device.

FIG. 2 is a circuit diagram showing an example of the amplifier circuit 41, which serves as a lane of the LVDS receiver. The amplifier circuit 41 includes an amplifier 42 and an amplifier 43. A bias voltage VB is applied to the amplifier 42 and the amplifier 43 and bias currents flow therethrough, whereby a desirable output signal can be obtained.

Differential signals IN_P and IN_N are input to the amplifier 42, and the amplifier 42 outputs output signals OUT_P and OUT_N. Differential signals OUT_P and OUT_N are input to the amplifier 43, and the amplifier 43 outputs an output signal OUT. Although the amplifier 42 has low gain, the linearity of gain is high; thus, the differential signals IN_P and IN_N are linearly amplified and output as the differential signals. The differential signals OUT_P and OUT_N output from the amplifier 42 are input to the amplifier 43 and amplified to a power supply voltage level rapidly.

The power source circuit 90 has a function of generating a voltage such as the bias voltage VB and a voltage VDD and output the voltages to the circuits such as the amplifier 42 and the amplifier 43. A switching signal STBY is input to the amplifier 42 and the amplifier 43 from the switching control circuit 95. When the switching signal STBY is active, each bias current is blocked to reduce power consumption.

Figure 6:
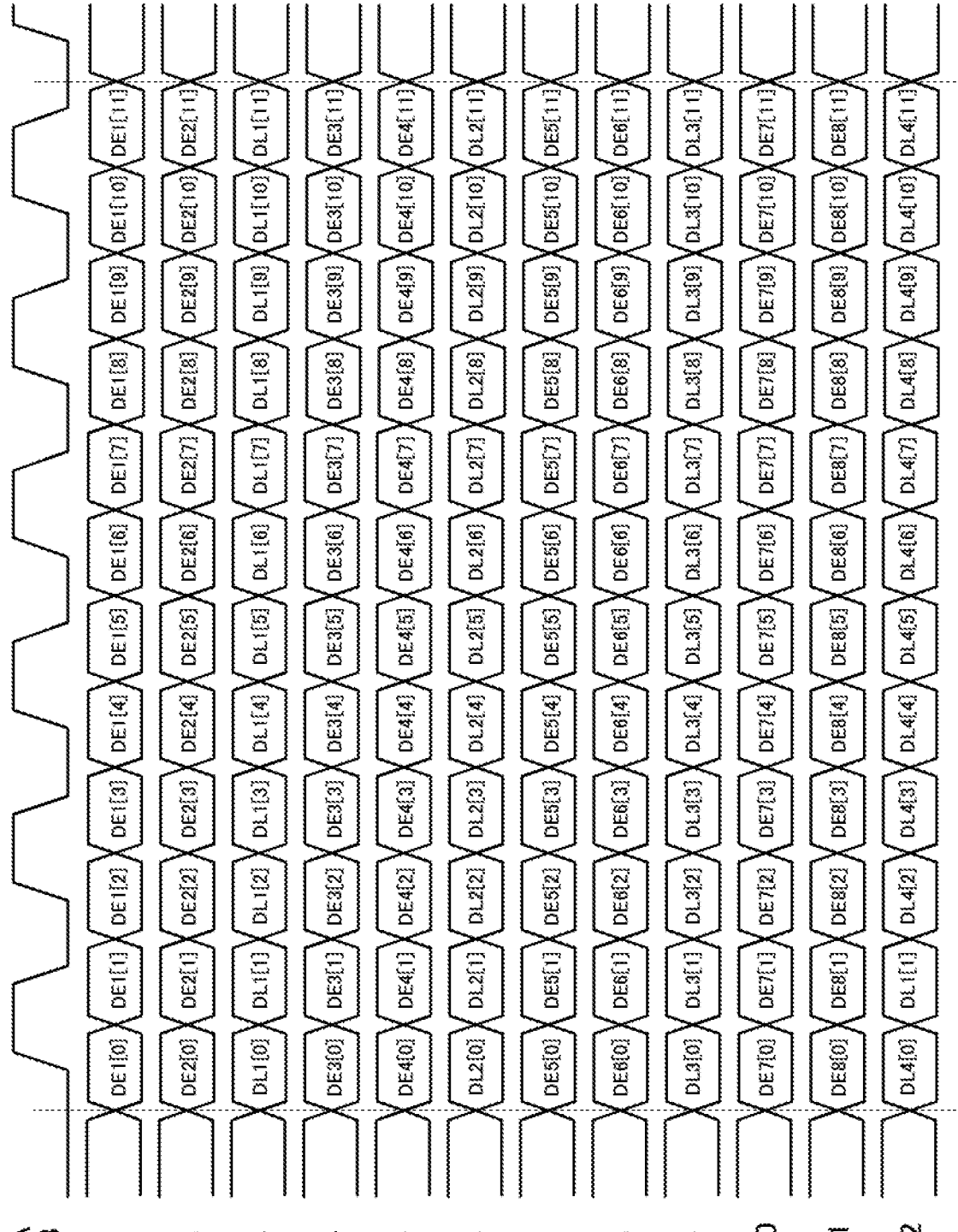
FIG. 6 is a timing chart illustrating a structure example of a display device.

Although the amplifier circuit 41 serving as a lane of the LVDS receiver is illustrated in FIG. 2, the differential signals are transmitted and received between the amplifier circuit 40 and the amplifier circuit 41 over a plurality of lanes. FIG. 6 shows an example of a timing chart showing differential signals on the twelve lanes. In FIG. 6, on the lanes 1, 2, 4, 5, 7, 8, 10, and 11, differential signals corresponding to image data DE1[0]-[11] to DE8[0]-[11] for controlling display using the light-emitting element EL are transmitted and received. In FIG. 6, on the lanes 3, 6, 9, and 12, differential signals corresponding to image data DL1[0]-[11] to DL4[0]-[11] for controlling display using the liquid crystal element LC are transmitted and received. As other signals, clock signals CLKA and CLKB are shown in FIG. 6.

Figure 5:
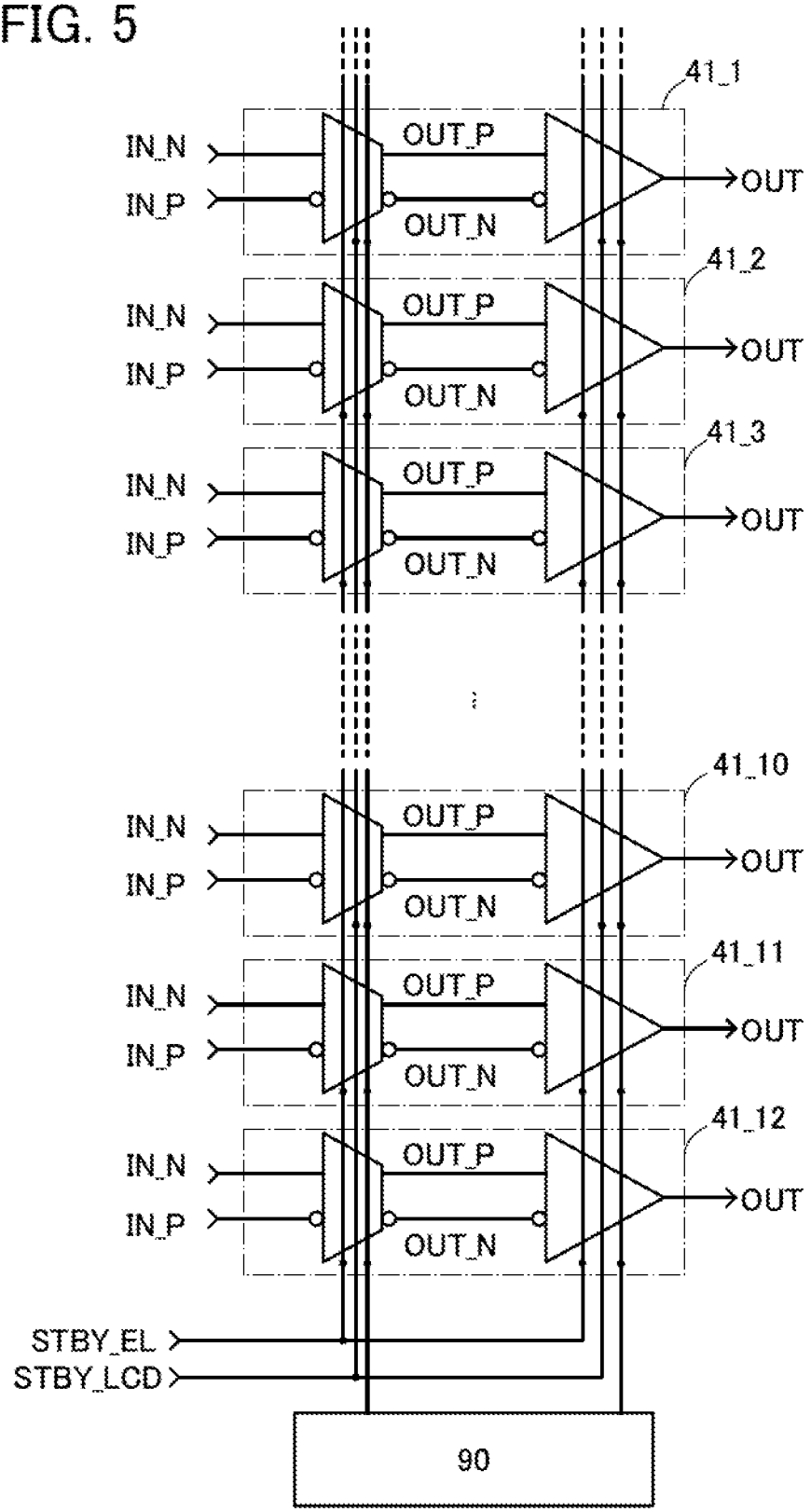
FIG. 5 is a circuit diagram illustrating a structure example of a display device.

FIG. 5 shows a circuit diagram of amplifier circuits 41_1 to 41_12, which serve as an LVDS receiver in which differential signals are received on the twelve lanes shown in FIG. 6. As in FIG. 2, the bias voltage VB is applied to each of the amplifier circuits 41_1 to 41_12 from the power supply circuit 90. In FIG. 5, a switching signal STBY_EL corresponding to the switching signal STBY is supplied to the amplifier circuits 41_1, 41_2, 41_4, 41_5, 41_7, 41_8, 41_10, and 41_11 which correspond to the lanes 1, 2, 4, 5, 7, 8, 10, and 11, respectively. In addition, in FIG. 5, a switching signal STBY_LC corresponding to the switching signal STBY is supplied to the amplifier circuits 41_3, 41_6, 41_9, and 41_12 which correspond to the lanes 3, 6, 9, and 12, respectively.

A plurality of bias voltages are applied to the amplifier circuits 41_1 to 41_12 and bias currents flow therethrough, whereby a desired output signal can be obtained. In such a structure where the liquid crystal element LC and the light-emitting element EL are switched for display, a bias current continues to flow through the amplifier included in an amplifier circuit that does not contribute to display, which might increase power consumption. In contrast, in the case where the liquid crystal element LC and the light-emitting element EL are controlled with one driver circuit, the operation of the entire driver circuit is difficult to stop.

In the structure of one embodiment of the present invention, in the driver circuit for driving the liquid crystal element LC or the light-emitting element EL, a switch is provided between the transistor included in the amplifier and a wiring for supplying a bias voltage to supply a bias current; thus, the amplifier included in the amplifier circuit on each lane can be controlled in a stand-by mode independently.

Specifically, in the example in FIG. 5 and FIG. 6, in a period during which a grayscale voltage is not output to the light-emitting element EL, no electrical continuity is established between the wiring for supplying a bias voltage and a gate of the transistor for supplying a bias current in the amplifier circuits 41_1, 41_2, 41_4, 41_5, 41_7, 41_8, 41_10, and 41_11 which correspond to the lanes 1, 2, 4, 5, 7, 8, 10, and 11, respectively, and electrical continuity is established between the gate of the transistor and a wiring for supplying a voltage (VDD, GND, or the like). This can prevent the bias current from flowing and reduce power consumption.

Similarly, in the example in FIG. 5 and FIG. 6, in a period during which a grayscale voltage is not output to the liquid crystal element LC, no electrical continuity is established between the wiring for supplying a bias voltage and a gate of the transistor for supplying a bias current in the amplifier circuits 41_3, 41_6, 41_9, and 41_12 which correspond to the lanes 3, 6, 9, and 12, respectively, and electrical continuity is established between the gate of the transistor and a wiring for supplying a voltage (VDD, GND, or the like). This can prevent the bias current from flowing and reduce power consumption.

The aforementioned control of electrical continuity between the gate of the transistor for supplying a bias current and the wiring for supplying a bias voltage is performed by a switching signal STBY_EL and a switching signal STBY_LC.

Figure 3A:
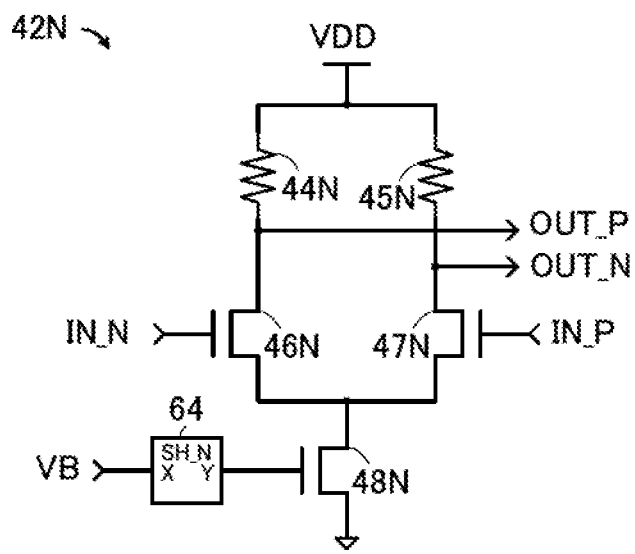
FIGS. 3A and 3B are circuit diagrams illustrating structure examples of a display device.
Figure 3B:
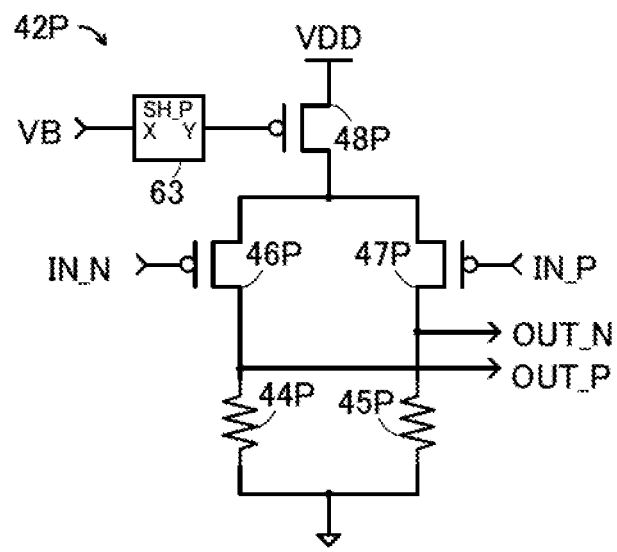

Next, FIGS. 3A and 3B show examples of circuits of the amplifier 42 illustrated in FIG. 2.

An amplifier 42N illustrated in FIG. 3A which can be used as the amplifier 42 in FIG. 2 includes a resistor 44N, a resistor 45N, and transistors 46N to 48N. The transistors 46N to 48N are n-channel transistors. As the transistor used in the amplifier 42N, a transistor having high field-effect mobility, in particular, a transistor including single crystal silicon in a semiconductor layer is preferably used.

The amplifier 42N illustrated in FIG. 3A further includes a switch 64 between a gate of the transistor 48N and a wiring for supplying the bias voltage VB.

An amplifier 42P illustrated in FIG. 3B which can be used as the amplifier 42 in FIG. 2 includes a resistor 44P, a resistor 45P, and transistors 46P to 48P. The transistors 46P to 48P are p-channel transistors. As the transistor used in the amplifier 42P, a transistor having high field-effect mobility, in particular, a transistor including single crystal silicon in a semiconductor layer is preferably used.

The amplifier 42P illustrated in FIG. 3B further includes a switch 63 between a gate of the transistor 48P and a wiring for supplying the bias voltage VB.

Figure 4A:
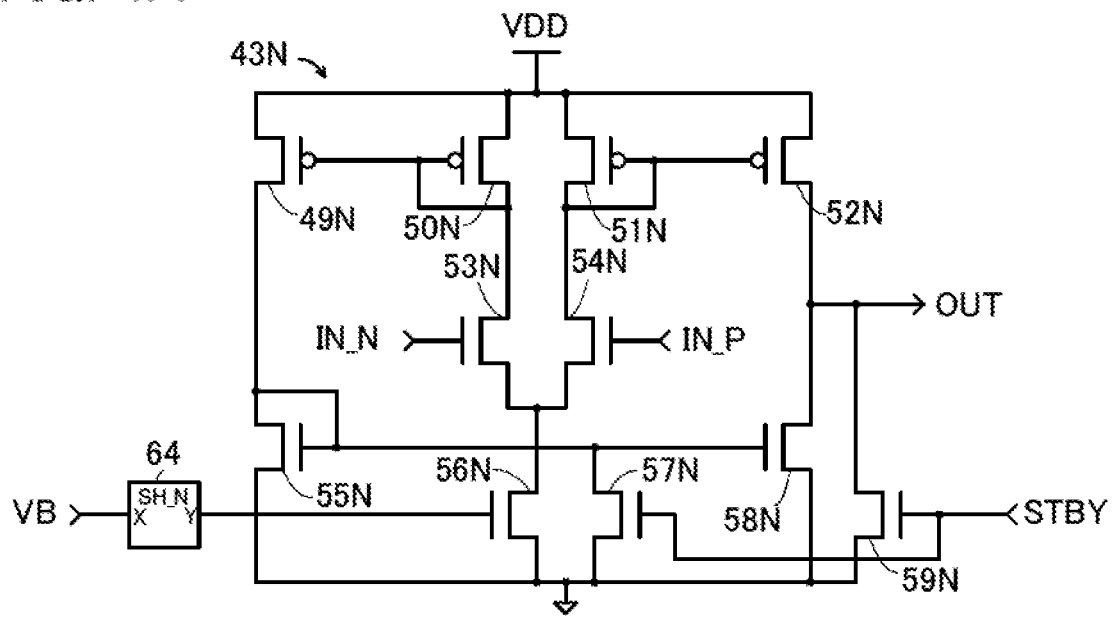
FIGS. 4A and 4B are circuit diagrams illustrating structure examples of a display device.
Figure 4B:
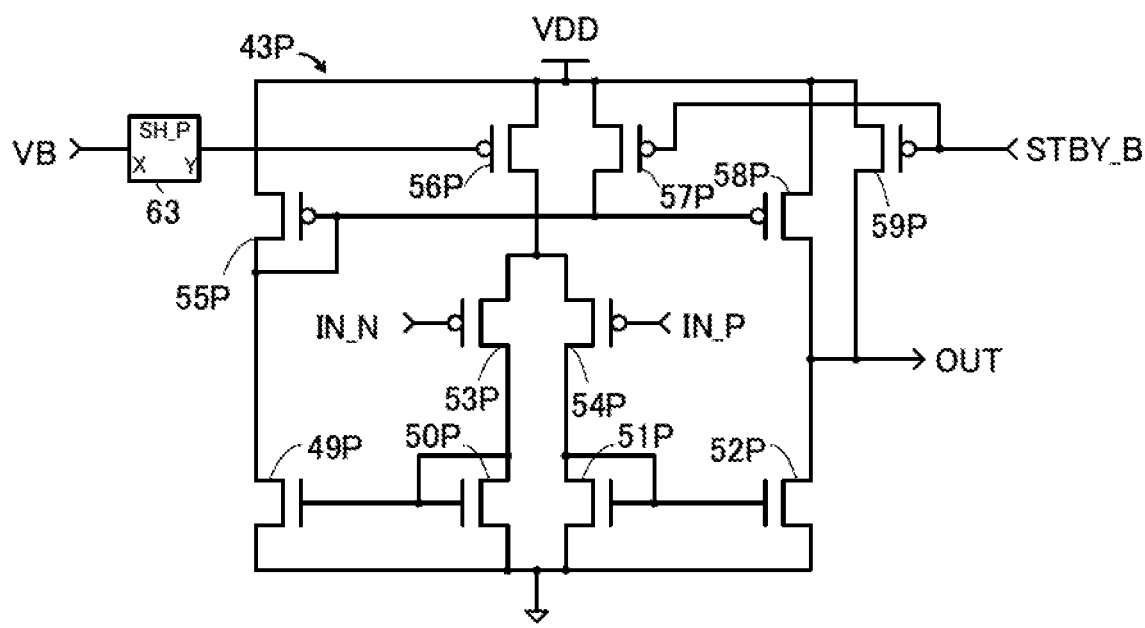

Then, FIGS. 4A and 4B show examples of circuits of the amplifier 43 illustrated in FIG. 2.

An amplifier 43N illustrated in FIG. 4A which can be used as the amplifier 43 in FIG. 2 includes transistors 49N to 59N. The transistors 49N to 52N are p-channel transistors and the transistors 53N to 59N are n-channel transistors. As the transistor used in the amplifier 43N, a transistor having high field-effect mobility, in particular, a transistor including single crystal silicon in a semiconductor layer is preferably used.

The amplifier 43N illustrated in FIG. 4A further includes the switch 64 between a gate of the transistor 56N and a wiring for supplying the bias voltage VB.

An amplifier 43P illustrated in FIG. 4B which can be used as the amplifier 43 in FIG. 2 includes transistors 49P to 59P. The transistors 49P to 52P are n-channel transistors and the transistors 53P to 59P are p-channel transistors. As the transistor used in the amplifier 43P, a transistor having high field-effect mobility, in particular, a transistor including single crystal silicon in a semiconductor layer is preferably used.

The amplifier 43P illustrated in FIG. 4B further includes the switch 63 between a gate of the transistor 56P and a wiring for supplying the bias voltage VB.

In each structure of FIGS. 3A and 3B and FIGS. 4A and 4B, when the switching signal STBY is active and no electrical continuity is established between the gate of the transistor and the wiring for supplying the bias voltage VB by the switch 63 or 64, each bias current can be blocked to reduce power consumption.

The switching signal STBY illustrated in FIG. 2 functions as the switching signal STBY_EL or the switching signal STBY_LC. An inverted signal of the switching signal STBY illustrated in FIG. 2 is a switching signal STBY_B.

Figure 7:
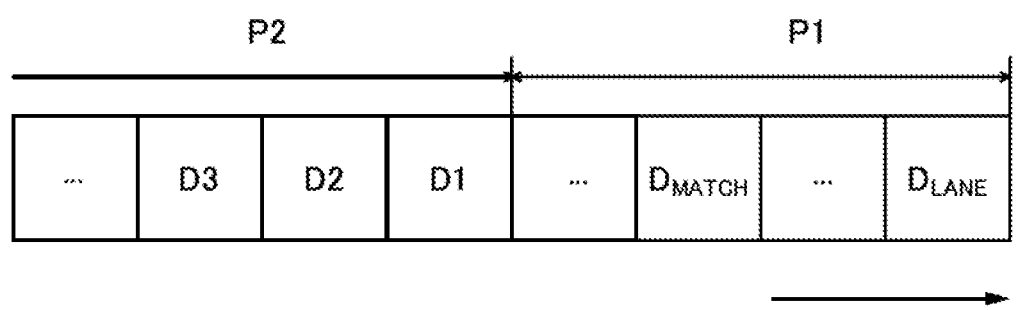
FIG. 7 is a diagram illustrating timing at which differential signals are input to a driver circuit.

FIG. 7 is a diagram illustrating timing at which the differential signals input to the amplifier circuit 41 are input to the driver circuit 14. Period P1 corresponds to a period during which image data is not transmitted. Period P2 corresponds to a period during which image data (D1, D2, and D3) are transmitted. Period P1 includes a vertical synchronizing signal, data ($D_{LANE}$) for determining a lane of the LVDS receiver to be stopped, and matching data ($D_{MATCH}$) for ensuring the normal operation of the receiving circuit 93 when restored. Note that the period during which image data is not transmitted may include audio data or a variety of packet data as necessary.

The operation of transmitting a lane corresponding to image data to be displayed from the normal operation to the stopped state is described. In Period P1, a lane of the LVDS receiver to be stopped and data of the switching signal STBY are obtained by the controller 94. The controller 94 outputs the control signal EN to the switching control circuit 95 on the basis of the obtained data on the lane to be stopped and the switching control circuit 95 makes one or both of the switching signal STBY_LCD and the switching signal STBY_EL active, whereby a function of the lane of the LVDS receiver is stopped. Note that the stopped lane cannot receive image data from the host processor 99 side before a restoration procedure.

Then, restoration operations of the lane from the stopped state to the normal operation state are described. First, data from the host processor 99 which makes the switching signal STBY inactive is obtained by the controller 94. There is no limitation on the timing at which the active switching signal STBY is turned into an inactive signal. The controller 94 outputs the control signal EN to the switching control circuit 95 on the basis of the obtained data on the switching signal STBY and the switching control circuit 95 makes one or both of the switching signal STBY_LCD and the switching signal STBY_EL inactive, whereby the function of the lane of the LVDS receiver is restored. The LVDS receiver is an analog circuit and it takes several microseconds to several hundreds of microseconds for the LVDS receiver to operate normally; thus, immediately after the operation is started, data cannot be received normally. Thus, to examine whether image data is received normally, matching data in Period P1 is utilized. Until the matching is performed normally, circuits following after the controller 94, that is, the signal generation circuit 96 and the like are not operated. After the matching can be performed normally, the restoration operation is completed, and the normal operation is returned. Note that the results of the matching may be transmitted to the host processor 99 by utilizing inter integrated circuit (I2C) communication or the like.

<Configuration Example of Switch>

Configuration examples of the above-described switch which can control the stop and restart of a bias current are described with reference to FIGS. 8A to 8D.

Figure 8A:
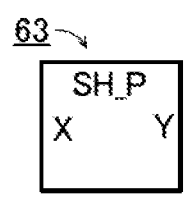
FIGS. 8A to 8D illustrate structure examples of a display device.

FIG. 8A is a circuit diagram of the switch 63 illustrated in FIG. 3B and FIG. 4B. In the switch 63 illustrated in FIG. 8A, the switching signals STBY and STBY_B switch the state where electrical continuity is established between a terminal X and a terminal Y and the state where electrical continuity is established between the terminal Y and a wiring for supplying the voltage VDD.

Figure 8B:
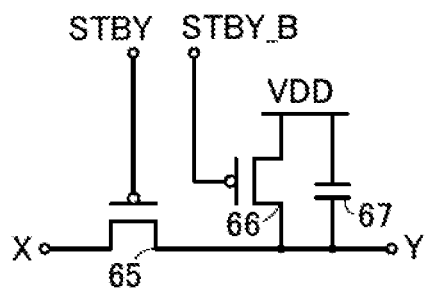

Specifically, the switch 63 illustrated in FIG. 8A can be shown by a circuit diagram of FIG. 8B. The switch 63 illustrated in FIG. 8B includes p-channel transistors 65 and 66 and a capacitor 67.

Figure 8C:
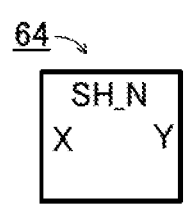

FIG. 8C is a circuit diagram of the switch 64 illustrated in FIG. 3A and FIG. 4A. In the switch 64 illustrated in FIG. 8C, the switching signals STBY and STBY_B switch the state where electrical continuity is established between the terminal X and the terminal Y and the state where electrical continuity is established between the terminal Y and a wiring for supplying a ground voltage.

Figure 8D:
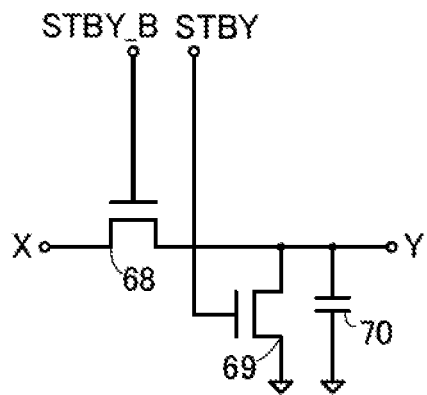

Specifically, the switch 64 illustrated in FIG. 8C can be shown by a circuit diagram of FIG. 8D. The switch 64 illustrated in FIG. 8D includes n-channel transistors 68 and 69 and a capacitor 70.

The operations of the amplifiers 42 and 43 in FIGS. 3A and 3B and FIGS. 4A and 4B can be stopped or restarted with use of the switches 63 and 64 illustrated in FIGS. 8A to 8D. The bias current stops or restarts flowing in the structures of FIGS. 3A and 3B and FIGS. 4A and 4B, allowing the stop and the restart to be switched more quickly than that in the structure where the function of the entire driver circuit is stopped.

<Operation Mode of Display Device>

An operation mode of the display device will be described with reference to FIGS. 9A to 9E and FIGS. 10A to 10C.

The operation mode of the display device can be switched with the surrounding illuminance. A block diagram of FIG. 9A illustrates the sensor 91 and the host processor 99 shown in FIG. 1.

Figure 9A:
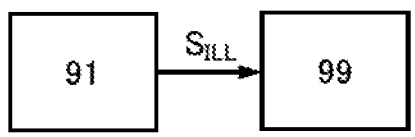
FIGS. 9A to 9E are a block diagram, schematic diagrams, and a state transition diagram illustrating a structure example of a display device.

The sensor 91 in FIG. 9A has a function of, for example, generating a signal SILL based on illuminance. The host processor 99 has a function of switching the display mode with the signal $S_{ILL}$.

Figure 9B:
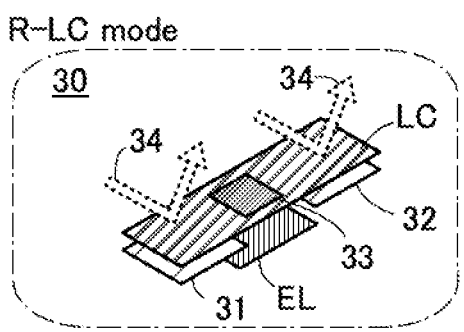
Figure 9C:
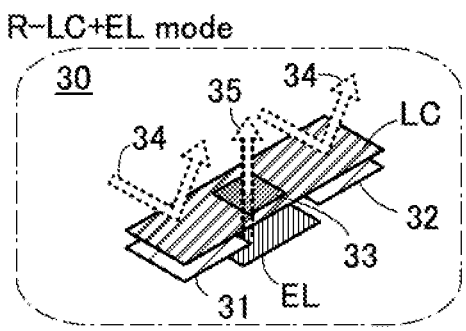
Figure 9D:
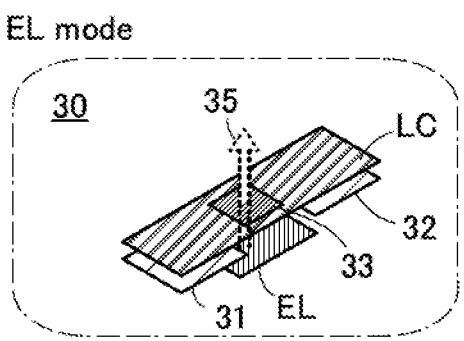

FIGS. 9B to 9D are schematic diagrams of a pixel for describing possible display modes of the display device with different illuminances. Note that FIGS. 9B to 9D illustrate, similarly to FIG. 1, the pixel circuit 31, the pixel circuit 32, the liquid crystal element LC, the light-emitting element EL, the opening 33, the reflected light 34 reflected on the reflective electrode of the liquid crystal element LC, and the light 35 emitted from the light-emitting element EL through the opening 33.

As the possible display modes of the display device, a reflective liquid crystal display mode (R-LC mode), a reflective liquid crystal+EL display mode (R-LC+EL mode), and an EL display mode (EL mode) will be described as illustrated in FIGS. 9B to 9D.

In the reflective liquid crystal display mode, grayscale display is performed by adjusting the intensity of reflected light with the liquid crystal element included in the pixel. Specifically, as shown in the schematic diagram of the pixel in FIG. 9B, the intensity of the reflected light 34 reflected on the reflective electrode of the liquid crystal element LC is adjusted by the liquid crystal layer, whereby grayscale display is performed.

In the reflective liquid crystal +EL display mode (R-LC +EL mode), grayscale display is performed by adjusting both the intensity of reflected light and the intensity of light emitted from the light-emitting element with the liquid crystal element and the light-emitting element. Specifically, as shown in the schematic diagram of the pixel in FIG. 9C, the intensity of the reflected light 34 reflected on the reflective electrode of the liquid crystal element LC and the intensity of the light 35 emitted from the light-emitting element EL through the opening 33 are adjusted to perform grayscale display.

In the EL display mode (EL mode), grayscale display is performed by adjusting the intensity of light with the light-emitting element. Specifically, as shown in the schematic diagram of the pixel in FIG. 9D, the intensity of the light 35 emitted from the light-emitting element EL through the opening 33 is adjusted to perform grayscale display.

Figure 9E:
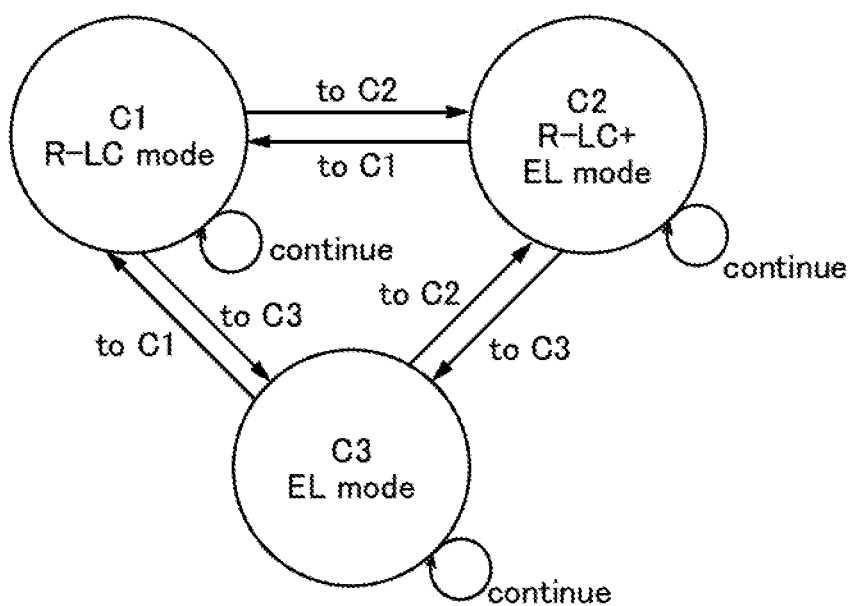

FIG. 9E shows a state transition diagram of the aforementioned three modes (the reflective liquid crystal display mode, the reflective liquid crystal +EL display mode, and the EL display mode). A state C1, a state C2, and a state C3 represent the reflective liquid crystal display mode, the reflective liquid crystal+EL display mode, and the EL display mode, respectively.

As shown in FIG. 9E, any of the display modes can be selected with illuminance in the states C1 to C3. For example, under a high illuminance such as in outdoor environments, the state can be brought into C1. In the case where the illuminance decreases as from outdoors to indoors, the state C1 transfers to the state C3. In the case where a high illuminance is obtained even indoors so that grayscale display can be performed with reflected light, the state C3 transfers to the state C2.

The above structure of switching the display mode with illuminance contributes to a reduction in the frequency of grayscale display with the intensity of light emitted from the light-emitting element, which requires a relatively high power consumption. Accordingly, the power consumption of the display device can be reduced.

In the display device, the operation mode can be further switched in accordance with the amount of remaining battery power, the contents to be displayed, or the illuminance of the surrounding environment. A normal driving mode (Normal mode) with a normal frame frequency and an idling stop (IDS) driving mode with a low frame frequency will be described below.

Note that the idling stop (IDS) driving refers to a method in which after image data is written, rewriting of image data is stopped. This increases the interval between writing of image data and subsequent writing of image data, thereby reducing the power that would be consumed by writing of image data in that interval.

The aforementioned normal driving mode and idling stop (IDS) driving mode will be described with reference to FIGS. 10A to 10C as examples.

Figure 10A:
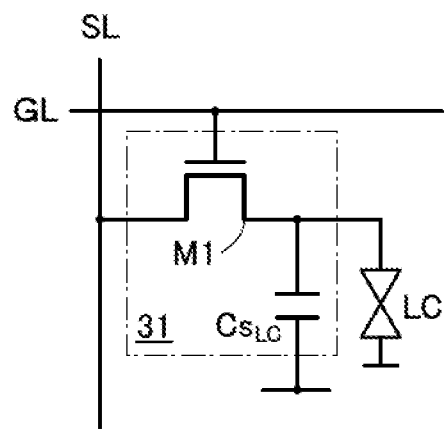
FIGS. 10A to 10C are a circuit diagram and timing charts illustrating a structure example of a display device.

FIG. 10A is a circuit diagram of a pixel including the liquid crystal element LC and the pixel circuit 31. FIG. 10A illustrates a transistor M1 connected to a signal line SL and a gate line GL, a capacitor CsLc, and the liquid crystal element LC.

A transistor including a metal oxide in a semiconductor layer is preferably used as the transistor M1. A metal oxide having at least one of an amplification function, a rectification function, and a switching function can be referred to as a metal oxide semiconductor or an oxide semiconductor (abbreviated to an OS). As a typical example of a transistor, a transistor including an oxide semiconductor (OS transistor) is described. The OS transistor has an extremely low leakage current in a non-conduction state (off-state current), so that charge can be retained in a pixel electrode of a liquid crystal element when the OS transistor is turned off.

Figure 10B:
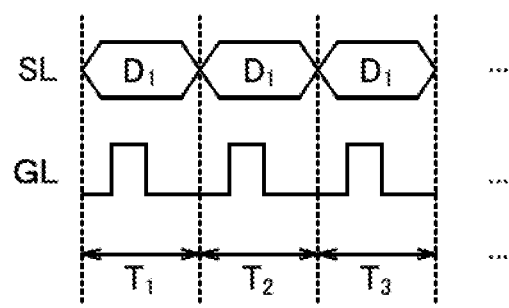

FIG. 10B is a timing chart showing waveforms of signals supplied to the signal line SL and the gate line GL in the normal driving mode. In the normal driving mode, a normal frame frequency (e.g., 60 Hz) is used for operation. In the case where one frame period is divided into periods $T_1$ to $T_3$, a scanning signal is supplied to the gate line in each period and data $D_1$ of the signal line is written to the pixel. This operation is performed both to write the same data $D_1$ in the periods $T_1$ to $T_3$ and to write different data in the periods $T_1$ to $T_3$.

Figure 10C:
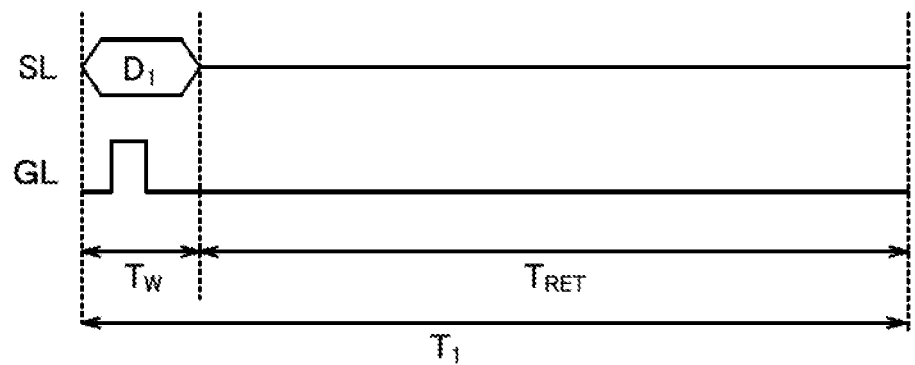

In contrast, FIG. 10C is a timing chart showing waveforms of signals supplied to the signal line SL and the gate line GL in the idling stop (IDS) driving. In the idling stop (IDS) driving, a low frame frequency (e.g., 1 Hz) is used for operation. One frame period is denoted by a period $T_1$ and includes a data writing period $T_W$ and a data retention period $T_{RET}$. In the idling stop (IDS) driving, a scanning signal is supplied to the gate line and the data $D_1$ of the signal line is written to the pixel in the period $T_W$, the gate line is fixed to a low-level voltage in the period $T_{RET}$, and the transistor M1 is turned off so that the written data $D_1$ is retained in the pixel.

The idling stop (IDS) driving mode is effective in combination with the aforementioned reflective liquid crystal display mode or reflective liquid crystal+EL display mode, in which case power consumption can be further reduced.

<Structure Example of Pixel>

A structure example of the pixel will be described with reference to FIG. 11, FIGS. 12A to 12C, and FIGS. 13A and 13B.

Figure 11:
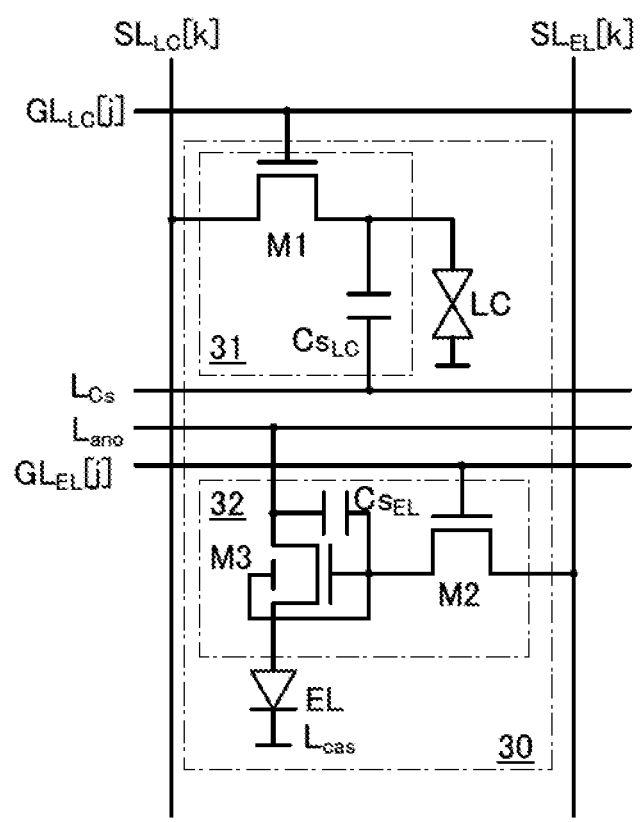
FIG. 11 is a circuit diagram illustrating a structure example of a display device.

The pixel 30 will be described. FIG. 11 illustrates an example of a circuit diagram of the pixel 30. The pixel 30 includes, as described in FIG. 1, the pixel circuit 31, the pixel circuit 32, the liquid crystal element LC, and the light-emitting element EL.

In FIG. 11, the pixel circuit 31 includes the transistor M1 and the capacitor $Cs_{LC}$. The pixel circuit 32 includes transistors M2 and M3 and a capacitor $Cs_{EL}$. The components in the pixel 30 are connected to a gate line $GL_{LC}[j]$, a gate line $GL_{EL}[j]$, a signal line $SL_{LC}[k]$, a signal line $SL_{EL}[k]$, a capacitor line Lcs, a current supply line $L_{ano}$, and a common potential line $L_{cas}$ as illustrated in FIG. 11.

Note that the capacitor $Cs_{EL}$ is provided in order to retain a grayscale voltage for driving the light-emitting element EL in a gate of the transistor M3. This structure enables more accurate retention of the grayscale voltage for driving the light-emitting element EL.

Note that the transistor M3 includes a back gate, which increases the amount of current flowing through the transistor. A voltage applied to the back gate may be supplied from another wiring, in which case the threshold voltage of the transistor can be controlled.

By controlling the electrical continuity of the transistor M1, a grayscale voltage for driving the liquid crystal element LC is applied to the capacitor $Cs_{LC}$. By controlling the electrical continuity of the transistor M2, a grayscale voltage for driving the light-emitting element EL is applied to the gate of the transistor M3. The light-emitting element EL is driven when current flows between the current supply line $L_{ano}$ and the common potential line $L_{cas}$ in accordance with the voltage of the gate of the transistor M3.

N-channel transistors can be used as the transistors M1 to M3. The n-channel transistors can be replaced with p-channel transistors by changing the magnitude relationship among voltages of the wirings. Silicon can be used as semiconductor materials of the transistors M1 to M3. As silicon, single crystal silicon, polysilicon, microcrystalline silicon, amorphous silicon, or the like can be used as appropriate.

Alternatively, an oxide semiconductor can be used as the semiconductor materials of the transistors M1 to M3.

The oxide semiconductor used as the semiconductor materials of the transistors M1 to M3 preferably has a cloud-aligned composite (CAC)-OS structure.

The CAC-OS has, for example, a composition in which elements included in an oxide semiconductor are unevenly distributed. Materials including unevenly distributed elements each have a size of greater than or equal to 0.5 nm and less than or equal to 10 nm, or greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, or greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to the element M in a second region, the first region has higher In concentration than the second region.

Note that a compound including In, Ga, Zn, and O is also known as IGZO.

Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ (−1≤x0≤1; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

Note that a boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under the conditions where a substrate is not heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

For the transistors M1 to M3 included in the pixel 30, various types of transistors such as a bottom-gate transistor and a top-gate transistor can be used.

The transistors M1 to M3 included in the pixel 30 may include back gates. Voltages applied to the back gates may be supplied from a wiring different from the gate line $GL_{LC}[j]$ and the gate line $GL_{EL}[j]$. Only one transistor, for example, the transistor M3 may have a back gate. With such a structure, the threshold voltage of the transistor can be controlled or the amount of current flowing through the transistor can be increased.

The liquid crystal element can be driven by any of the following driving methods: an in-plane-switching (IPS)

mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like. In addition, the liquid crystal element can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode.

For the liquid crystal element, a liquid crystal material such as thermotropic liquid crystal, low-molecular liquid crystal, high-molecular liquid crystal, polymer dispersed liquid crystal, ferroelectric liquid crystal, or anti-ferroelectric liquid crystal can be used. Alternatively, a liquid crystal material that exhibits a cholesteric phase, a smectic phase, a cubic phase, a chiral nematic phase, an isotropic phase, or the like can be used. Alternatively, a liquid crystal material that exhibits a blue phase can be used.

Note that the light-emitting element can be an EL element such as an organic electroluminescence element or an inorganic electroluminescence element, a light-emitting diode, or the like.

Note that in the case of using a light-emitting diode, graphene or graphite may be provided under an electrode or a nitride semiconductor of the light-emitting diode. Graphene or graphite may be a multilayer film in which a plurality of layers are stacked. As described above, the provision of graphene or graphite enables easy formation of a nitride semiconductor thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the light-emitting diode may be formed by metal organic chemical vapor deposition (MOCVD). Note that when the graphene is provided, the GaN semiconductor layers included in the light-emitting diode can also be formed by a sputtering method.

A stack formed to emit white light can be used as the EL element. Specifically, it is possible to use a stack of a layer containing a light-emitting organic compound containing a fluorescent material that emits blue light, and a layer containing a material that is other than a fluorescent material and that emits green light and red light, or a layer containing a material that is other than a fluorescent material and that emits yellow light.

Next, a layout diagram of a pixel which can be used as the pixel 30 is described. A circuit diagram of FIG. 12A is equivalent to the circuit diagram of FIG. 11.

The layout diagram in FIG. 12B corresponds to the arrangement of the components in the circuit diagram in FIG. 12A. FIG. 12B illustrates an electrode $PE_{EL}$ of the light-emitting element EL, the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, and the current supply line $L_{ano}$.

The layout diagram in FIG. 12C corresponds to the arrangement of the components in the circuit diagram in FIG. 12A. FIG. 12C illustrates a reflective electrode $PE_{LC}$ of the liquid crystal element LC, an opening 33 arranged so as to overlap with the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, and the current supply line $L_{ano}$.

Although the liquid crystal element LC and the light-emitting element EL are provided separately in the layout diagrams in FIGS. 12B and 12C, they are provided to overlap with each other.

Figure 13A:
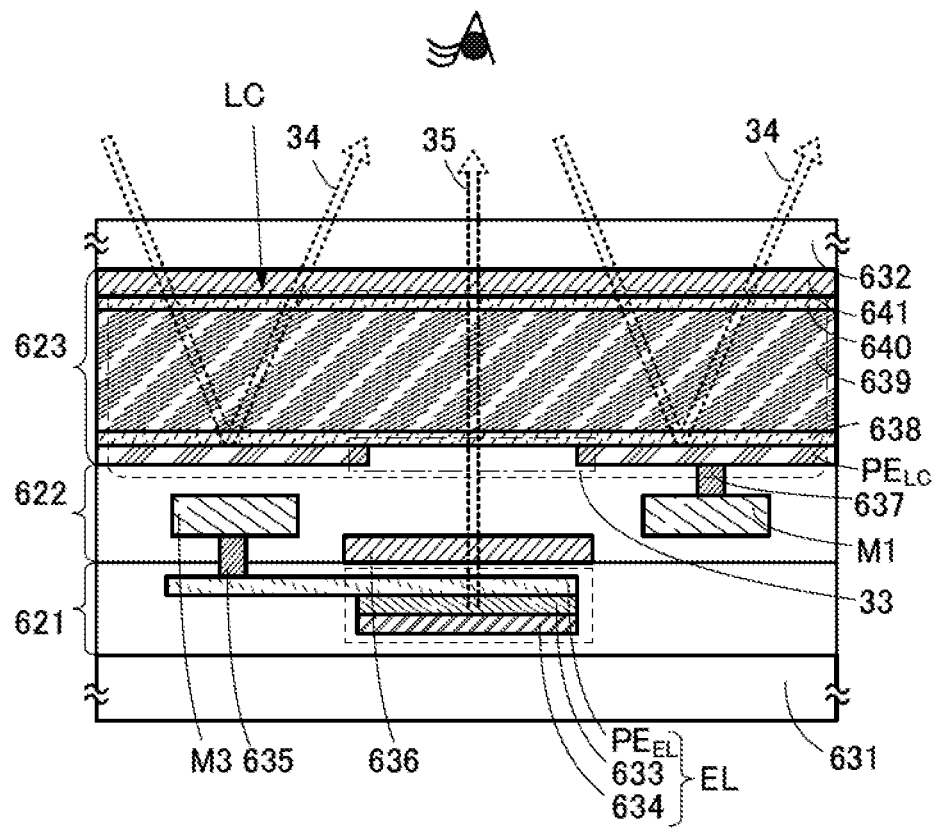
FIGS. 13A and 13B are a schematic cross-sectional view and a perspective view illustrating a structure example of a display device.

FIG. 13A is a schematic cross-sectional view illustrating a stacked structure of the liquid crystal element LC and the light-emitting element EL. In FIG. 13A, a layer 621 including the light-emitting element EL, a layer 622 including the transistor, and a layer 623 including the liquid crystal element LC are illustrated. The layers 621 to 623 are provided between substrates 631 and 632. Although not illustrated, an optical member such as a polarizing plate, a circularly polarizing plate, or an anti-reflective film may be included.

The layer 621 includes the light-emitting element EL. The light-emitting element EL includes the electrode $PE_{EL}$ illustrated in FIG. 12B, a light-emitting layer 633, and an electrode 634. When current flows to the light-emitting layer 633 between the electrode $PE_{EL}$ and the electrode 634, the light 35 (denoted by a dotted arrow) is emitted. The intensity of the light 35 is controlled by the transistor M3 in the layer 622.

The layer 622 includes the transistors M1 and M3, and a color filter 636. The layer 622 further includes a conductive layer 637 functioning as an electrode for connecting the transistor M1 and the reflective electrode $PE_{LC}$, and a conductive layer 635 functioning as an electrode for connecting the transistor M3 and the electrode PEEL.

The color filter 636 is provided when the light-emitting element EL emits white light, and the light 35 with a specific wavelength can be emitted to the viewer side. The color filter 636 is provided so as to overlap with the opening 33. The transistors M1 to M3 (the transistor M2 is not illustrated) are provided so as to overlap with the reflective electrode $PE_{LC}$.

The layer 623 includes the opening 33, the reflective electrode $PE_{LC}$, a conductive layer 638, a liquid crystal 639, a conductive layer 640, and a color filter 641. Orientation of the liquid crystal 639 between a pair of the conductive layer 638 and the conductive layer 640 is controlled by the conductive layer 638. The reflective electrode $PE_{LC}$ reflects the external light and emits the reflected light 34 (denoted by a dotted arrow). The intensity of the reflected light 34 is controlled by adjustment of orientation of the liquid crystal 639 by the transistor Ml. The opening 33 is provided in a position that transmits the light 35 emitted from the light-emitting element EL in the layer 621.

A material that reflects visible light can be used for the reflective electrode $PE_{LC}$, for example. Specifically, a material containing silver can be used for the reflective film. For example, a material containing silver, palladium, and the like or a material containing silver, copper, and the like can be used for the reflective film. Alternatively, for example, a material with unevenness on its surface can be used for the reflective film. In that case, incident light can be reflected in various directions so that a white image can be displayed.

A material that transmits visible light can be used for the conductive layers 638 and 640. Specifically, a conductive oxide such as indium oxide, indium tin oxide, indium zinc oxide, zinc oxide, or zinc oxide to which gallium is added, or graphene can be used.

For example, a light-transmitting inorganic material such as glass or ceramics can be used for the substrates 631 and 632. Alternatively, a flexible material, for example, an organic material such as a resin film or plastics can be used for the substrates 631 and 632. Note that members such as a polarizing plate, a retardation plate, and a prism sheet can be stacked on the substrates 631 and 632 as appropriate.

For example, an insulating inorganic material, an insulating organic material, or an insulating composite material containing an inorganic material and an organic material can be used for the insulating layer included in the display device. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers such as the conductive layers 635 and 637 included in the display device can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used. Alternatively, an alloy containing any of the above-described metal elements, or the like can be used for the wiring or the like.

The light-emitting layer 633 included in the display device is formed by combining any of an EL layer, a charge-transport layer, and a charge-injection layer freely. For example, a low molecular organic EL material or a high molecular organic EL material is used. As the EL layer, a thin film made of a light-emitting material that emits light (fluorescence) by singlet excitation (a singlet compound) or a thin film made of a light-emitting material that emits light (phosphorescence) by triplet excitation (a triplet compound) can be used. In addition, an inorganic material such as silicon carbide can also be used as the charge-transport layer and the charge-injection layer. The organic EL material and inorganic material may be formed using known materials.

The electrode $PE_{EL}$ included in the display device functions as an anode of the light-emitting element EL. A material for forming the anode has a work function higher than that of a material for forming a cathode. For example, indium oxide tin oxide (ITO), indium oxide zinc oxide ($In_2O_3$—ZnO), or zinc oxide (ZnO), or a material having lower sheet resistance than ITO, such as platinum (Pt), chromium (Cr), tungsten (W), or nickel (Ni) can be used.

The electrode 634 included in the display device can be formed using a metal having a low work function (typically, a metal element which belongs to Group 1 or Group 2 of the periodic table), or an alloy thereof. As the work function is lower, the luminous efficiency is improved; thus, in particular, an alloy material containing lithium (Li), which is an alkali metal, is preferably used as a material used for the cathode.

Figure 13B:
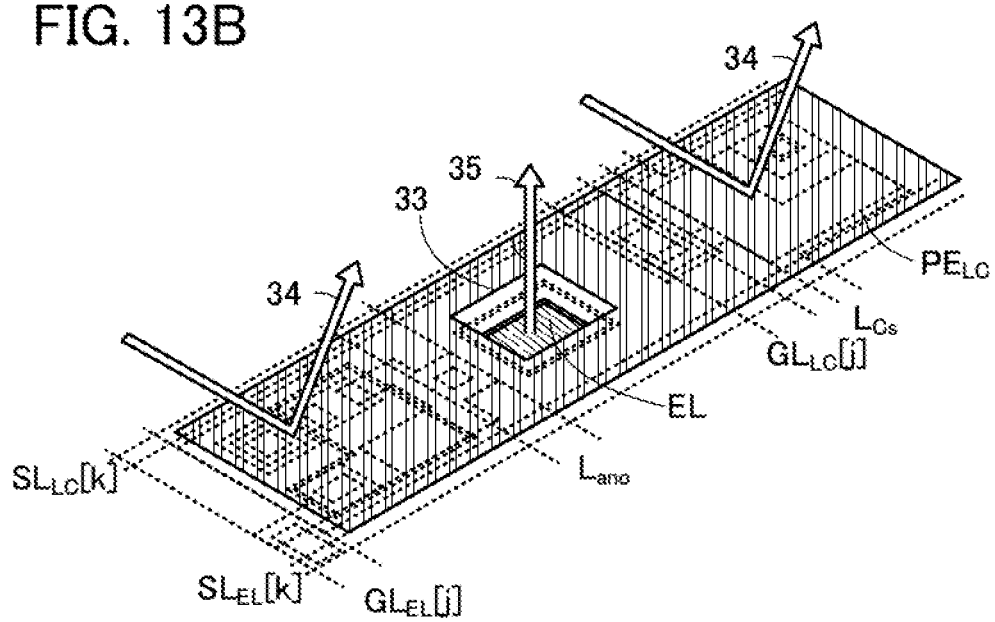

FIG. 13B is a perspective view in which the layout diagrams in FIGS. 12B and 12C overlap with each other for illustrating the stacked structure of the liquid crystal element LC and the light-emitting element EL. As illustrated in FIG. 13B, the liquid crystal element LC and the light-emitting element EL are provided to overlap with each other. Then, the opening 33 is provided in a position that transmits the light 35 emitted from the light-emitting element EL. With such a structure, switching of display elements in accordance with the surrounding environment can be achieved without increasing the area occupied by the pixel. Consequently, a display device with improved visibility can be obtained.

<Cross-sectional Structure Example>

Cross-sectional structure examples of the pixel and other portions are described with reference to FIG. 14 and FIGS. 15A to 15C.

Figure 14:
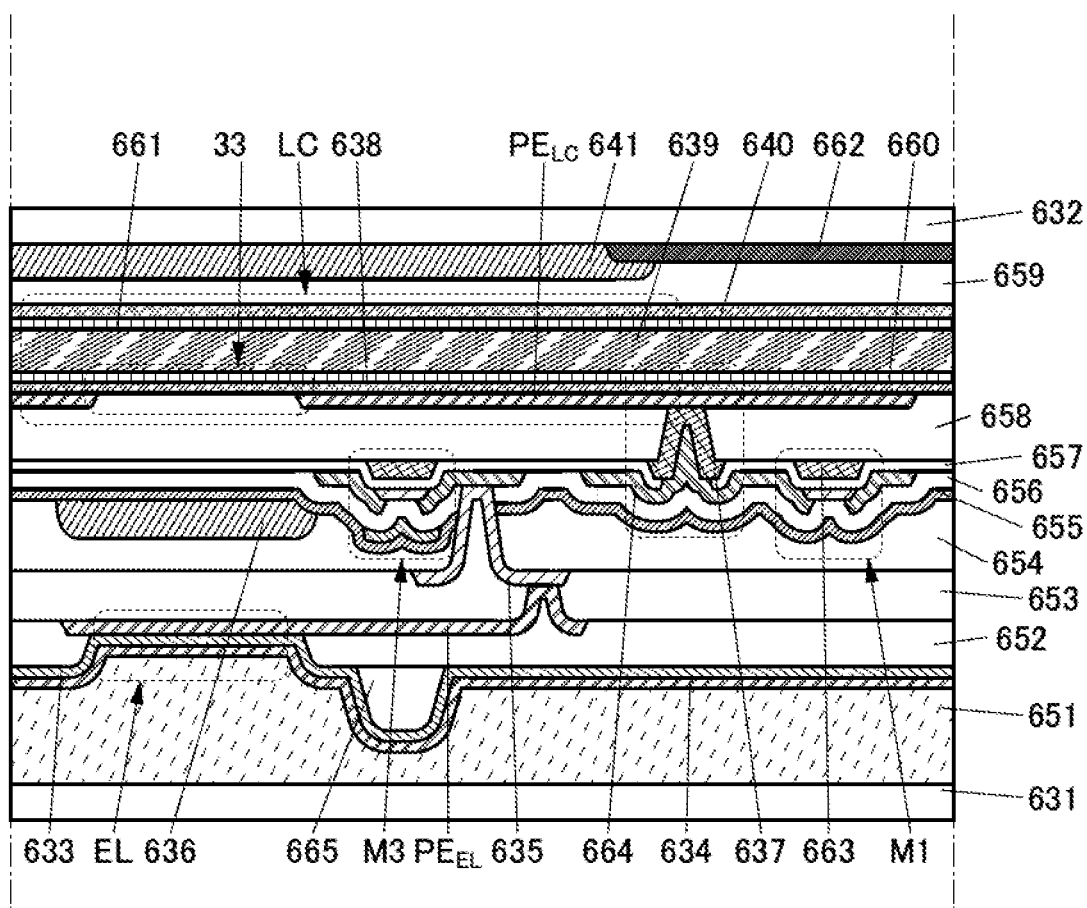
FIG. 14 is a schematic cross-sectional view illustrating a structure example of a display device.

FIG. 14 shows a detailed schematic cross-sectional view of the pixel in FIG. 13A. In FIG. 14, the same components as in FIG. 13A are denoted by the same reference numerals and the description thereof is not repeated.

In the schematic cross-sectional view of the pixel of the display device in FIG. 14, in addition to the components in FIG. 13A, an adhesive layer 651, an insulating layer 652, an insulating layer 653, an insulating layer 654, an insulating layer 655, an insulating layer 656, an insulating layer 657, an insulating layer 658, an insulating layer 659, an alignment film 660, an alignment film 661, a light-blocking film 662, a conductive layer 663, a conductive layer 664, and an insulating layer 665 are provided between the substrates 631 and 632.

The insulating layer 652, the insulating layer 653, the insulating layer 654, the insulating layer 655, the insulating layer 656, the insulating layer 657, the insulating layer 658, the insulating layer 659, and the insulating layer 665 can be formed using an insulating inorganic material, an insulating organic material, or an insulating composite material containing an inorganic material and an organic material. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers 663 and 664 can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used for the conductive layer. Alternatively, an alloy containing any of the above-described metal elements, or the like can be used for the wiring or the like.

As the adhesive layer 651, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, and the like. In particular, a material with low moisture permeability, such as an epoxy resin, is preferred. Alternatively, a two-component type resin may be used. Still alternatively, an adhesive sheet or the like may be used.

For the alignment film 660 and the alignment film 661, an organic resin such as polyimide can be used. In the case where optical alignment treatment for aligning the liquid crystal 639 in a predetermined direction is performed, the alignment film 660 and the alignment film 661 may be omitted. Also in the case of using a liquid crystal which does not need alignment treatment, the alignment film 660 and the alignment film 661 may be omitted.

The light-blocking film 662 can be formed using a light-blocking material which absorbs light, such as chromium, chromium oxide, or a black resin.

FIGS. 15A to 15C show schematic cross-sectional views of a terminal portion, a driver circuit portion, and a common contact portion which correspond to the schematic cross-sectional view of the pixel of the display device in FIG. 14. In FIGS. 15A to 15C, the same components as in FIG. 13A and FIG. 14 are denoted by the same reference numerals and the description thereof is not repeated.

FIG. 15A is the schematic cross-sectional view of the terminal portion of the display device. In a connection portion 670 for connection to an external circuit in the terminal portion, the conductive layer 637, the conductive layer 664, the reflective electrode Pac, and the conductive layer 638 are stacked. A flexible printed circuit (FPC) 672 is connected to the connection portion 670 through a connection layer 671. An adhesive layer 673 is provided at an end portion of the substrate 632, thereby attaching the substrate 632 to the substrate 631.

FIG. 15B is the schematic cross-sectional view of the driver circuit portion of the display device. A transistor 680 in the driver circuit portion can have the same structure as the transistor M3.

FIG. 15C is the schematic cross-sectional view of the common contact portion of the display device. At a connection portion 690 in the common contact portion, the conductive layer 640 on the substrate 632 side is connected to the conductive layer 638 and the reflective electrode Pax on the substrate 631 side through a connector 691 in the adhesive layer 673.

<Display Module>

A display module including a display device of one embodiment of the present invention is described with reference to FIG. 16. The display module including the display device of one embodiment of the present invention can reduce power consumption or improve visibility or convenience.

Figure 16:
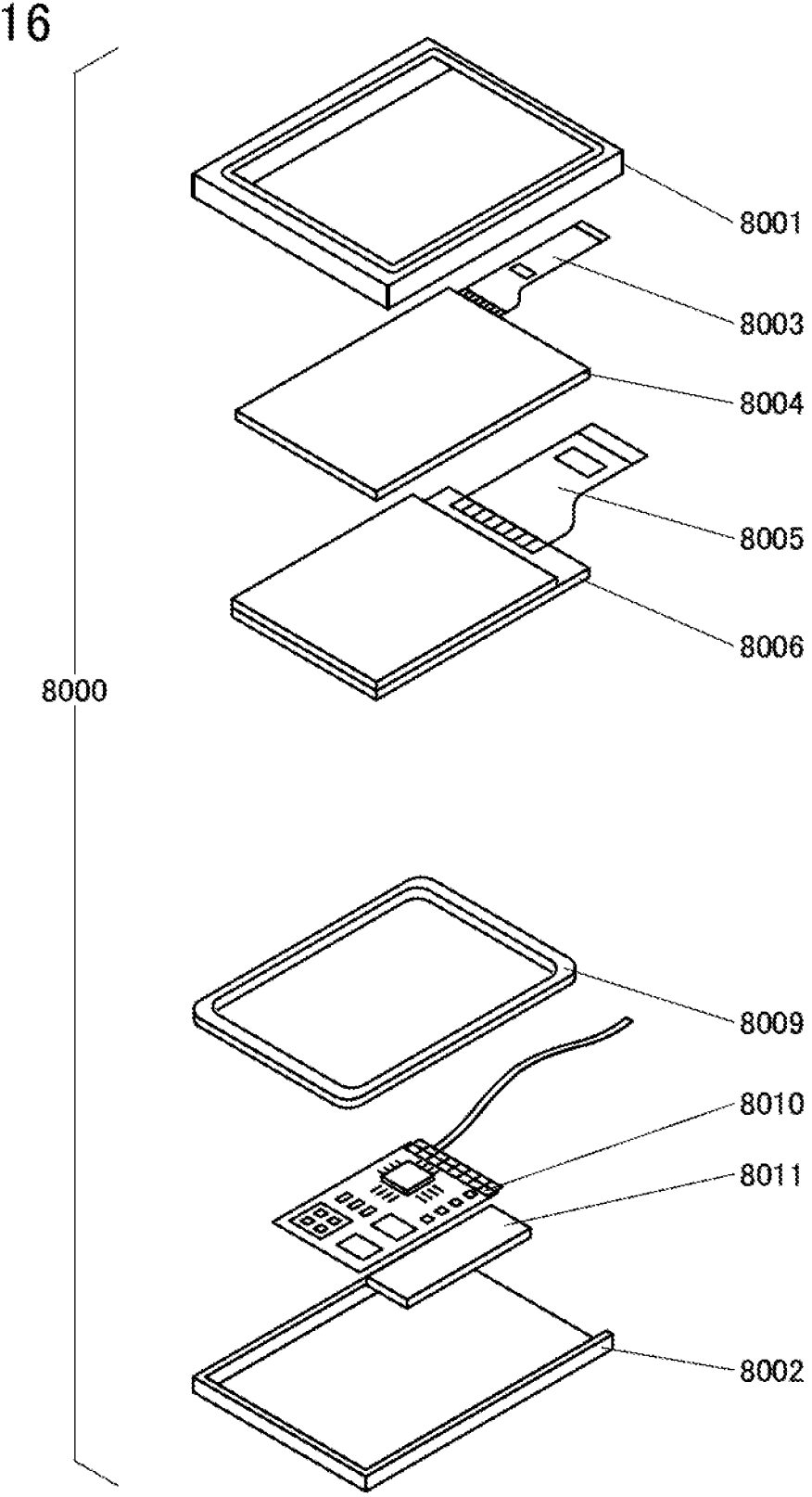
FIG. 16 illustrates a display module.

In a display module 8000 illustrated in FIG. 16, a touch panel 8004 connected to an FPC 8003, a display panel 8006 connected to an FPC 8005, a frame 8009, a printed circuit board 8010, and a battery 8011 are provided between an upper cover 8001 and a lower cover 8002.

The display device of one embodiment of the present invention can be used for, for example, the display panel 8006. Thus, excellent visibility can be maintained outdoors or indoors.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor can be provided in each pixel of the display panel 8006 to form an optical touch panel.

The frame 8009 protects the display panel 8006 and also functions as an electromagnetic shield for blocking electromagnetic waves generated by the operation of the printed circuit board 8010. The frame 8009 may function as a radiator plate.

The printed circuit board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

<Electronic Appliance>

FIGS. 17A to 17G illustrate electronic appliances. These electronic appliances can include a housing 9000, a display portion 9001, a speaker 9003, operation keys 9005 (including a power switch or an operation switch), a connection terminal 9006, a sensor 9007 (a sensor having a function of measuring or sensing force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 9008, and the like. The display portion 9001 includes the display module of one embodiment of the present invention, leading to a reduction in power consumption or an improvement in visibility or convenience.

The electronic appliances illustrated in FIGS. 17A to 17G can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Note that functions that can be provided for the electronic appliances illustrated in FIGS. 17A to 17G are not limited to those described above, and the electronic appliances can have a variety of functions. Although not illustrated in FIGS. 17A to 17G, the electronic appliance may include a plurality of display portions. Furthermore, the electronic appliance may be provided with a camera and the like and have a function of shooting a still image, a function of shooting a moving image, a function of storing a shot image in a memory medium (an external memory medium or a memory medium incorporated in the camera), a function of displaying a shot image on the display portion, or the like.

The electronic appliances illustrated in FIGS. 17A to 17G are described in detail below.

FIG. 17A is a perspective view illustrating a television device 9100. The television device 9100 can include the display portion 9001 having a large screen size of, for example, 50 inches or more, or 100 inches or more.

FIG. 17B is a perspective view illustrating a portable information terminal 9101. The portable information terminal 9101 functions as, for example, one or more of a telephone set, a notebook, and an information browsing system. Specifically, the portable information terminal 9101 can be used as a smartphone. Note that the portable information terminal 9101 may include a speaker, a connection terminal, a sensor, and the like. The portable information terminal 9101 can display characters and image information on its plurality of surfaces. For example, three operation buttons 9050 (also referred to as operation icons or simply icons) can be displayed on one surface of the display portion 9001. Furthermore, information 9051 indicated by dashed rectangles can be displayed on another surface of the display portion 9001. Examples of the information 9051 include display indicating reception of an incoming email, social networking service (SNS) message, and call; the title and sender of an email and SNS message; the date; the time; remaining battery; and the reception strength of an antenna. Alternatively, the operation buttons 9050 or the like may be displayed in place of the information 9051.

FIG. 17C is a perspective view illustrating a portable information terminal 9102. The portable information terminal 9102 has a function of displaying information, for example, on three or more surfaces of the display portion 9001. Here, information 9052, information 9053, and information 9054 are displayed on different surfaces. For example, a user of the portable information terminal 9102 can see the display (here, the information 9053) with the portable information terminal 9102 put in a breast pocket of his/her clothes. Specifically, a caller's phone number, name, or the like of an incoming call is displayed in a position that can be seen from above the portable information terminal 9102. Thus, the user can see the display without taking out the portable information terminal 9102 from the pocket and decide whether to answer the call.

FIG. 17D is a perspective view illustrating a wrist-watch-type portable information terminal 9200. The portable information terminal 9200 is capable of executing a variety of applications such as mobile phone calls, e-mailing, reading and editing texts, music reproduction, Internet communication, and a computer game. The display surface of the display portion 9001 is bent, and images can be displayed on the bent display surface. The portable information terminal 9200 can employ near field communication that is a communication method based on an existing communication standard. In that case, for example, mutual communication between the portable information terminal 9200 and a headset capable of wireless communication can be performed, and thus hands-free calling is possible. Moreover, the portable information terminal 9200 includes the connection terminal 9006, and data can be directly transmitted to and received from another information terminal via a connector. Charging through the connection terminal 9006 is possible. Note that the charging operation may be performed by wireless power feeding without using the connection terminal 9006.

FIGS. 17E, 17F, and 17G are perspective views of a foldable portable information terminal 9201. FIG. 17E is a perspective view illustrating the portable information terminal 9201 that is opened. FIG. 17F is a perspective view illustrating the portable information terminal 9201 that is being opened or being folded. FIG. 17G is a perspective view illustrating the portable information terminal 9201 that is folded. The portable information terminal 9201 is highly portable when folded. When the portable information terminal 9201 is opened, a seamless large display region is highly browsable. The display portion 9001 of the portable information terminal 9201 is supported by three housings 9000 joined together by hinges 9055. By folding the portable information terminal 9201 at a connection portion between two housings 9000 with the hinges 9055, the portable information terminal 9201 can be reversibly changed in shape from an opened state to a folded state. For example, the portable information terminal 9201 can be bent with a radius of curvature of greater than or equal to 1 mm and less than or equal to 150 mm.

<Notes on Description of this Specification and the Like>

In this specification and the like, ordinal numbers such as first, second, and third are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case where one circuit is associated with a plurality of functions or a case where a plurality of circuits are associated with one function. Therefore, the segmentation of blocks in a block diagram is not limited by any of the components described in the specification and can be differently determined as appropriate depending on the situation.

The same elements or elements having similar functions, elements formed using the same material, elements formed at the same time, or the like in the drawings are denoted by the same reference numerals, and the description thereof is not repeated in some cases.

In this specification and the like, the terms "one of a source and a drain" (or first electrode or first terminal) and "the other of the source and the drain" (or second electrode or second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, "voltage" and "potential" can be replaced with each other. The term "voltage" refers to a potential difference from a reference potential. When the reference potential is a ground potential, for example, "voltage" can be replaced with "potential". The ground potential does not necessarily mean 0 V. Potentials are relative values, and a potential supplied to a wiring or the like is sometimes changed depending on the reference potential.

In this specification and the like, a switch is in a conductive state (on state) or in a non-conductive state (off state) to determine whether current flows therethrough or not. Alternatively, a switch has a function of selecting and changing a current path.

Examples of a switch are an electrical switch, a mechanical switch, and the like. That is, any element can be used as a switch as long as it can control current, without limitation to a certain element.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

In this specification and the like, the expression "A and B are connected" or "A is connected to B" means the case where A and B are electrically connected to each other as well as the case where A and B are directly connected to each other. Here, the expression "A and B are electrically connected" means the case where electric signals can be transmitted and received between A and B when an object having any electric action exists between A and B.

This application is based on Japanese Patent Application serial no. 2016-135720 filed with Japan Patent Office on Jul. 8, 2016, the entire contents of which are hereby incorporated by reference.

What is claimed is:

1. A display device comprising:
   a pixel; and
   a driver circuit,
   wherein the pixel comprises a liquid crystal element, a first pixel circuit for driving the liquid crystal element, a light-emitting element, and a second pixel circuit for driving the light-emitting element, wherein the liquid crystal element comprises a reflective electrode having an opening and is configured to perform grayscale display by reflecting external light, wherein the light-emitting element is configured to perform grayscale display by emitting light through the opening, wherein the driver circuit comprises a receiving circuit, a controller, a switching control circuit, and a signal generation circuit, wherein the receiving circuit is configured to convert a differential signal of serial data into image data of parallel data and output the image data to the controller, wherein the signal generation circuit is configured to output a grayscale voltage for driving the liquid crystal element and a grayscale voltage for driving the light-emitting element in accordance with control with the controller, wherein the receiving circuit comprises an amplifier circuit for receiving the differential signal, wherein the differential signal comprises a first differential signal for driving the liquid crystal element and a second differential signal for driving the light-emitting element, wherein the amplifier circuit comprises a first amplifier circuit to which the first differential signal is input and a second amplifier circuit to which the second differential signal is input, wherein the amplifier circuit comprises a switch and a first transistor for supplying a bias current, wherein the switch is configured to control electrical continuity between a wiring for supplying a bias voltage and a gate of the first transistor, and wherein the switching control circuit is configured to output a switching signal for controlling electrical continuity of the switch in accordance with control with the controller.

2. The display device according to claim 1, wherein the amplifier circuit comprises a first amplifier and a second amplifier.

3. The display device according to claim 1, further comprising a sensor and a processor, wherein the sensor is configured to measure illuminance, and wherein the processor is configured to switch between, in accordance with the illuminance, a first mode for performing grayscale display with the liquid crystal element, a second mode for performing grayscale display with the liquid crystal element and the light-emitting element, and a third mode for performing grayscale display with the light-emitting element.

4. The display device according to claim 1, wherein the first pixel circuit and the second pixel circuit each comprise a second transistor, and wherein the second transistor comprises a metal oxide in a semiconductor layer where a channel formation region is formed.

5. The display device according to claim 1, wherein the switching signal comprises a first switching signal to be supplied to the first amplifier circuit and a second switching signal to be supplied to the second amplifier circuit.

6. A display module comprising:
the display device according to claim 1; and
a touch panel.

7. An electronic device comprising:
the display device according to claim 1; and
an operation key or a battery.

8. A display device comprising:
a pixel comprising a liquid crystal element and a light-emitting element;
a driver circuit; and
a sensor configured to measure illuminance, wherein the driver circuit comprises a receiving circuit, a controller, and a switching control circuit, wherein the controller is configured to switch between, in accordance with the illuminance, a first mode for performing display with the liquid crystal element, a second mode for performing display with the liquid crystal element and the light-emitting element, and a third mode for performing display with the light-emitting element, wherein the receiving circuit is configured to convert a differential signal of serial data into image data of parallel data and output the image data to the controller, wherein the receiving circuit comprises an amplifier circuit for receiving the differential signal, wherein the differential signal comprises a first differential signal for driving the liquid crystal element and a second differential signal for driving the light-emitting element, wherein the amplifier circuit comprises a first amplifier circuit to which the first differential signal is input and a second amplifier circuit to which the second differential signal is input, wherein the amplifier circuit comprises a switch and a first transistor for supplying a bias current, wherein the switch is configured to control electrical continuity between a wiring for supplying a bias voltage and a gate of the first transistor, and wherein the switching control circuit is configured to output a switching signal for controlling electrical continuity of the switch in accordance with control with the controller.

9. The display device according to claim 8, wherein the amplifier circuit comprises a first amplifier and a second amplifier.

10. The display device according to claim 8, wherein a first pixel circuit for driving the liquid crystal element and a second pixel circuit for driving the light-emitting element each comprise a second transistor, and wherein the second transistor comprises a metal oxide in a semiconductor layer where a channel formation region is formed.

11. The display device according to claim 8, wherein the switching signal comprises a first switching signal to be supplied to the first amplifier circuit and a second switching signal to be supplied to the second amplifier circuit.

12. A display module comprising:
the display device according to claim 8; and
a touch panel.

13. An electronic device comprising:
the display device according to claim 8; and
an operation key or a battery.

14. A display device comprising:
a pixel comprising a first display element and a second display element; and
a driver circuit;

wherein the driver circuit comprises a receiving circuit, a controller, and a switching control circuit, wherein the receiving circuit is configured to convert a differential signal of serial data into image data of parallel data and output the image data to the controller, wherein the receiving circuit comprises an amplifier circuit for receiving the differential signal, wherein the differential signal comprises a first differential signal for driving the first display element and a second differential signal for driving the second display element, wherein the amplifier circuit comprises a first amplifier circuit to which the first differential signal is input and a second amplifier circuit to which the second differential signal is input, wherein each of the first amplifier circuit and the second amplifier circuit comprises a switch and a first transistor for supplying a bias current, wherein the switch is configured to control electrical continuity between a wiring for supplying a bias voltage and a gate of the first transistor, and wherein the switching control circuit is configured to output a switching signal for controlling electrical continuity of the switch in accordance with control with the controller.

15. The display device according to claim 14, further comprising a sensor and a processor, wherein the sensor is configured to measure illuminance, and wherein the processor is configured to switch between, in accordance with the illuminance, a first mode for performing grayscale display with the first display element, a second mode for performing grayscale display with the first display element and the second display element, and a third mode for performing grayscale display with the second display element.

16. The display device according to claim 14, wherein a first pixel circuit for driving the first display element and a second pixel circuit for driving the second display element each comprise a second transistor, and wherein the second transistor comprises a metal oxide in a semiconductor layer where a channel formation region is formed.

17. The display device according to claim 14, wherein the switching signal comprises a first switching signal to be supplied to the first amplifier circuit and a second switching signal to be supplied to the second amplifier circuit.

18. A display module comprising:
the display device according to claim 14; and
a touch panel.

19. An electronic device comprising:
the display device according to claim 14; and
an operation key or a battery.

20. A display device comprising:
a pixel comprising a first display element and a second display element; and
a driver circuit, wherein the driver circuit comprises a receiving circuit, a controller, a signal generation circuit, and a switching control circuit, wherein the receiving circuit is configured to convert a first differential signal into first image data and output the first image data to the controller, wherein the receiving circuit is configured to convert a second differential signal into second image data and output the second image data to the controller, wherein the signal generation circuit is configured to output a voltage for driving the first display element and a voltage for driving the second display element in accordance with control with the controller, wherein the receiving circuit comprises a first amplifier circuit for receiving the first differential signal and a second amplifier circuit for receiving the second differential signal, wherein each of the first amplifier circuit and the second amplifier circuit comprises a switch and a first transistor for supplying a bias current, wherein the switch is configured to control electrical continuity between a wiring for supplying a bias voltage and a gate of the first transistor, and wherein the switching control circuit is configured to output a switching signal for controlling electrical continuity of the switch in accordance with control with the controller.

* * * * *